(12) United States Patent
Choi et al.

(10) Patent No.: US 12,432,652 B2
(45) Date of Patent: Sep. 30, 2025

(54) METHOD AND ELECTRONIC DEVICE FOR COMMUNICATING BASED ON ACCESS POINT

(71) Applicant: SAMSUNG ELECTRONICS CO., LTD., Suwon-si (KR)

(72) Inventors: Jongmu Choi, Suwon-si (KR); Gyujin Lee, Suwon-si (KR); Bokun Choi, Suwon-si (KR); Mingu Kang, Suwon-si (KR); Suhyun Kim, Suwon-si (KR); Junhwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/668,850

(22) PCT Filed: Jan. 14, 2022

(86) PCT No.: PCT/KR2022/000717
§ 371 (c)(1),
(2) Date: Feb. 10, 2022

(87) PCT Pub. No.: WO2022/154564
PCT Pub. Date: Jul. 21, 2022

(65) Prior Publication Data
US 2023/0362805 A1     Nov. 9, 2023

(30) Foreign Application Priority Data
Jan. 18, 2021   (KR) .................. 10-2021-0006646

(51) Int. Cl.
*H04W 48/20*   (2009.01)
*H04W 48/16*   (2009.01)
*H04W 84/12*   (2009.01)

(52) U.S. Cl.
CPC .......... *H04W 48/20* (2013.01); *H04W 48/16* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,883,447 B2 * | 1/2018 | Yoon | ............... | H04W 48/04 |
| 10,111,156 B2 * | 10/2018 | Patil | ............... | H04W 48/08 |

(Continued)

FOREIGN PATENT DOCUMENTS

| | | |
|---|---|---|
| CN | 109740329 | 4/2021 |
| CN | 113392423 | 11/2021 |

(Continued)

OTHER PUBLICATIONS

Extended European Search Report dated Mar. 15, 2024 for EP Application No. 22739757.7.

(Continued)

*Primary Examiner* — Pablo N Tran
(74) *Attorney, Agent, or Firm* — Nixon & Vanderhye P.C.

(57) ABSTRACT

According to various embodiments, an electronic device may include: a communication module comprising communication circuitry configured to support a first communication method and a second communication method, a memory, and a processor operatively connected to the communication module and the memory. The processor may be configured to: control the electronic device to connect to a first AP included in a first AP list based on the first communication method, receive a signal based on the second communication method transmitted from an external electronic device, obtain account information about the external electronic device and a second AP list including information about a second AP connected with the external (Continued)

electronic device from the external electronic device based on the second communication method upon receiving the signal, determine at least one AP, based on the first AP list and the second AP list based on account information about the electronic device and the account information about the external electronic device at least partly matching, and control the electronic device to perform wireless communication with the external electronic device based on the first communication method through the determined AP.

17 Claims, 17 Drawing Sheets

(56) References Cited

U.S. PATENT DOCUMENTS

| | | | | |
|---|---|---|---|---|
| 10,313,860 | B2* | 6/2019 | Montemurro | H04W 52/0235 |
| 10,419,961 | B2* | 9/2019 | Lee | H04W 36/304 |
| 10,531,423 | B1* | 1/2020 | Hassan | H04W 64/00 |
| 10,771,468 | B1 | 9/2020 | Walker et al. | |
| 10,791,242 | B2* | 9/2020 | Ikeda | G06F 3/1236 |
| 11,178,532 | B2* | 11/2021 | Karaki | H04L 67/51 |
| 11,375,382 | B2* | 6/2022 | Brisebois | H04L 41/082 |
| 2004/0224690 | A1 | 11/2004 | Choi et al. | |
| 2008/0192698 | A1 | 8/2008 | Rue | |
| 2015/0131460 | A1* | 5/2015 | Sridhara | H04W 48/20 370/252 |
| 2015/0372965 | A1 | 12/2015 | Seon et al. | |
| 2016/0081009 | A1 | 3/2016 | Tailor et al. | |
| 2016/0242025 | A1 | 8/2016 | Aliyar | |
| 2018/0288660 | A1 | 10/2018 | Honda et al. | |
| 2019/0297482 | A1 | 9/2019 | Asakura | |
| 2019/0342738 | A1 | 11/2019 | Gao et al. | |
| 2020/0154348 | A1 | 5/2020 | Choi et al. | |
| 2020/0196358 | A1 | 6/2020 | Kim et al. | |
| 2021/0266805 | A1 | 8/2021 | Lee et al. | |
| 2023/0126424 | A1* | 4/2023 | Lagnado | G01S 19/34 455/456.6 |
| 2024/0098475 | A1* | 3/2024 | Chen | H04W 24/10 |

FOREIGN PATENT DOCUMENTS

| | | |
|---|---|---|
| KR | 10-0580244 | 5/2006 |
| KR | 10-2012-0030672 | 3/2012 |
| KR | 10-1398628 | 5/2014 |
| KR | 10-2017-0004534 | 1/2017 |
| KR | 10-2020-0001109 | 1/2020 |
| KR | 10-2020-0117147 | 10/2020 |

OTHER PUBLICATIONS

Search Report and Written Opinion issued Apr. 19, 2022 in counterpart International Patent Application No. PCT/KR2022/000717.

* cited by examiner

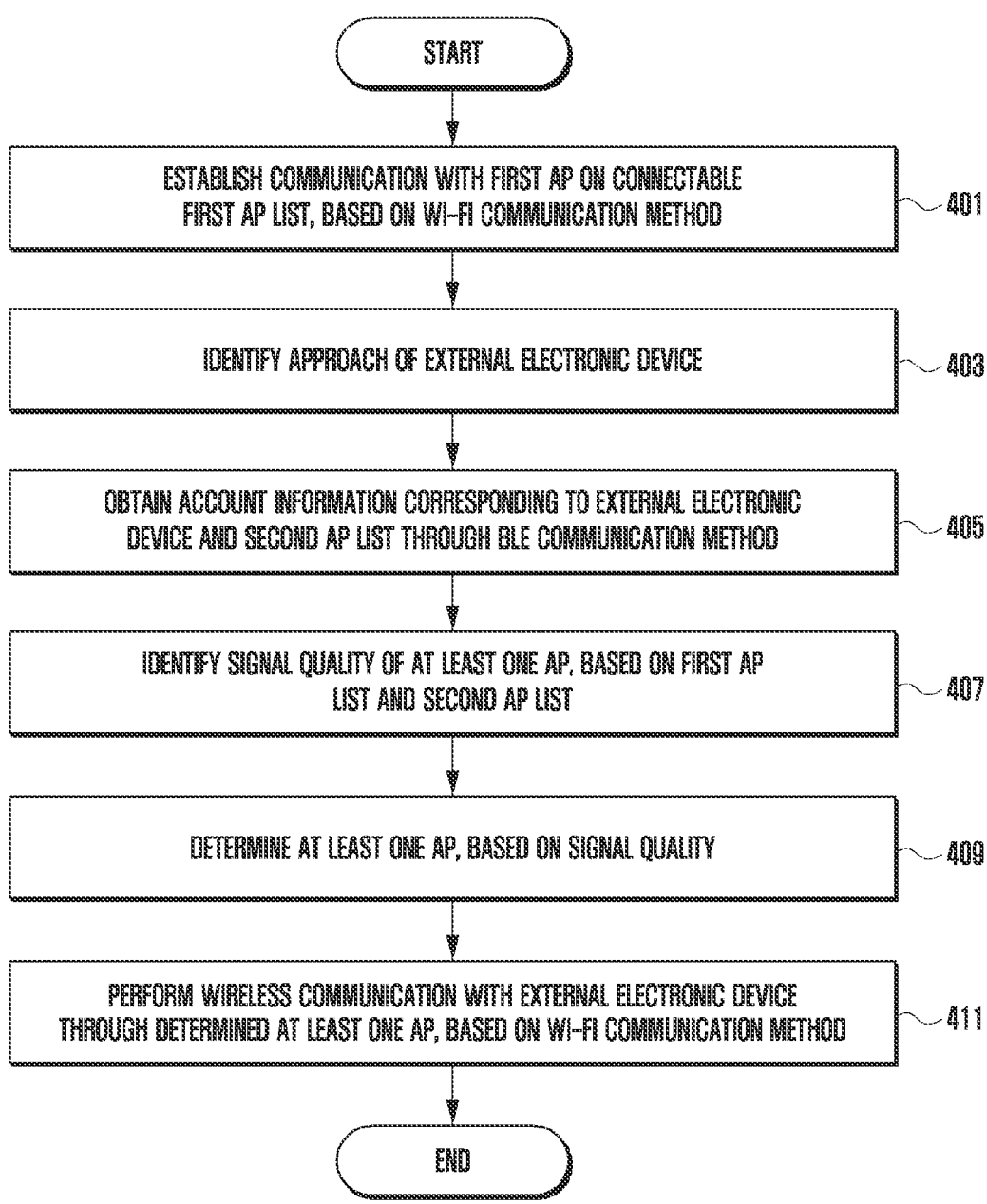

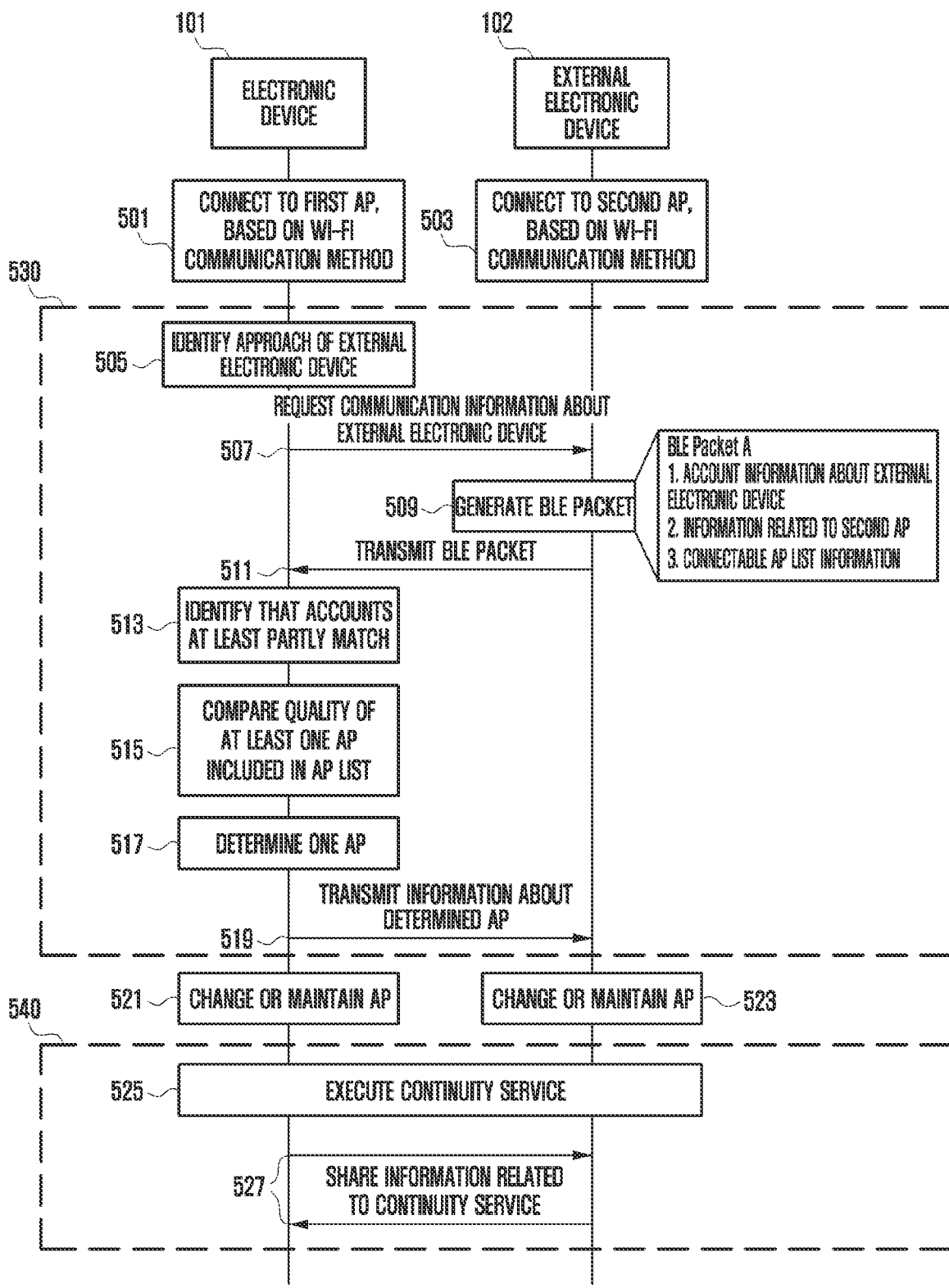

METHOD AND ELECTRONIC DEVICE FOR COMMUNICATING BASED ON ACCESS POINT

CROSS-REFERENCE TO RELATED APPLICATIONS

This application is a continuation of International Application No. PCT/KR2022/000717 designating the United States, filed on Jan. 14, 2022, in the Korean Intellectual Property Receiving Office and claiming priority to Korean Patent Application No. 10-2021-0006646, filed on Jan. 18, 2021, in the Korean Intellectual Property Office, the disclosures of which are incorporated by reference herein in their entireties.

BACKGROUND

Field

The disclosure relates to a method and an electronic device for communicating based on an access point

Description of Related Art

With the advancement of digital technology, various types of electronic devices, such as a personal digital assistant (PDA), an electronic organizer, a smartphone, a tablet personal computer (PC), and a wearable device, are widely used. These electronic devices may perform wireless communication with each other and may share data (e.g., context information) through wireless communication.

When using a plurality of electronic devices among which context information is shared, a user may independently utilize the shared context information in each electronic device.

At least one electronic device may share context information with other electronic devices, and each electronic device may independently utilize the context information. Generally, in sharing context information, an electronic device may store the context information in a memory of a central server, based on a specific account, and a different electronic device may download the context information corresponding to the specific account from the central server. For example, when the different electronic device needs context information about the electronic device, the different electronic device may access the central server and may download the context information about the electronic device from the central server.

When the context information is shared using the central server, latency may occur when obtaining the context information, and use of the central server may incur costs.

SUMMARY

Embodiments of the disclosure provide a method for exchanging data between electronic devices without using an external server in sharing data (e.g., context information) among a plurality of electronic devices, and an electronic device for implementing the same.

According to various example embodiments, an electronic device may include: a communication module comprising communication circuitry configured to support a first communication method and a second communication method, a memory, and a processor operatively connected to the communication module and the memory. The processor may be configured to: control the electronic device to connect to a first AP included in a first AP list based on the first communication method, receive a signal based on the second communication method transmitted from an external electronic device, obtain account information about the external electronic device and a second AP list including information about a second AP connected with the external electronic device from the external electronic device based on the second communication method upon receiving the signal, determine one AP, based on the first AP list and the second AP list based on account information about the electronic device and the account information about the external electronic device at least partly matching, and control the electronic device to perform wireless communication with the external electronic device based on the first communication method through the determined one AP.

According to various example embodiments, an external electronic device may include: a communication module comprising communication circuitry configured to support a first communication method and a second communication method, a memory, and a processor operatively connected to the communication module and the memory. The processor may be configured to: control the external electronic device to connect to a first AP included in a first AP list based on the first communication method, receive a request signal transmitted from an electronic device based on the second communication method, control the communication module to transmit account information about the external electronic device and a first AP list including information about the connected first AP to the electronic device based on the second communication method upon receiving the request signal, switch the connected first AP to a second AP in response to a request signal for requesting a switch to the second AP, and control the external electronic device to perform wireless communication with the electronic device based on the first communication method through the second AP.

A method according to various example embodiments may include: connecting to a first AP included in a first AP list based on a first communication method, receiving a signal based on a second communication method transmitted from an external electronic device connected to a second AP included in a second AP list, obtaining account information about the external electronic device and the second AP list including information about the second AP connected with the external electronic device from the external electronic device based on the second communication method upon receiving the signal, determining one AP based on the first AP list and the second AP list based on account information about the electronic device and the account information about the external electronic device at least partly matching, and performing wireless communication with the external electronic device based on the first communication method through the determined one AP.

According to various example embodiments of the disclosure, a plurality of electronic devices may share data (e.g., context information or clipboard information) and may utilize the shared data, without going through a server.

According to an example embodiment, an electronic device and an external electronic device may be connected to the same access point (AP) based on shared data, and may perform a continuity service through the same one AP.

According to an example embodiment, an electronic device and an external electronic device may share data through the same AP and may provide a continuity service to a user, without intervention of a server. In addition, various effects directly or indirectly identified through this document may be provided.

BRIEF DESCRIPTION OF THE DRAWINGS

In relation to the description of the drawings, the same or similar reference numerals may be used for the same or similar elements. Further, the above and other aspects, features and advantages of certain embodiments of the present disclosure will be more apparent from the following detailed description, taken in conjunction with the accompanying drawings, in which:

FIG. 4 is a flowchart illustrating an example method in which an electronic device communicates with an external electronic device, based on an AP according to various embodiments;

FIG. 5 is a signal flow diagram illustrating an example method in which an electronic device and an external electronic device execute a continuity service using the same AP according to various embodiments;

DETAILED DESCRIPTION

Figure 1:
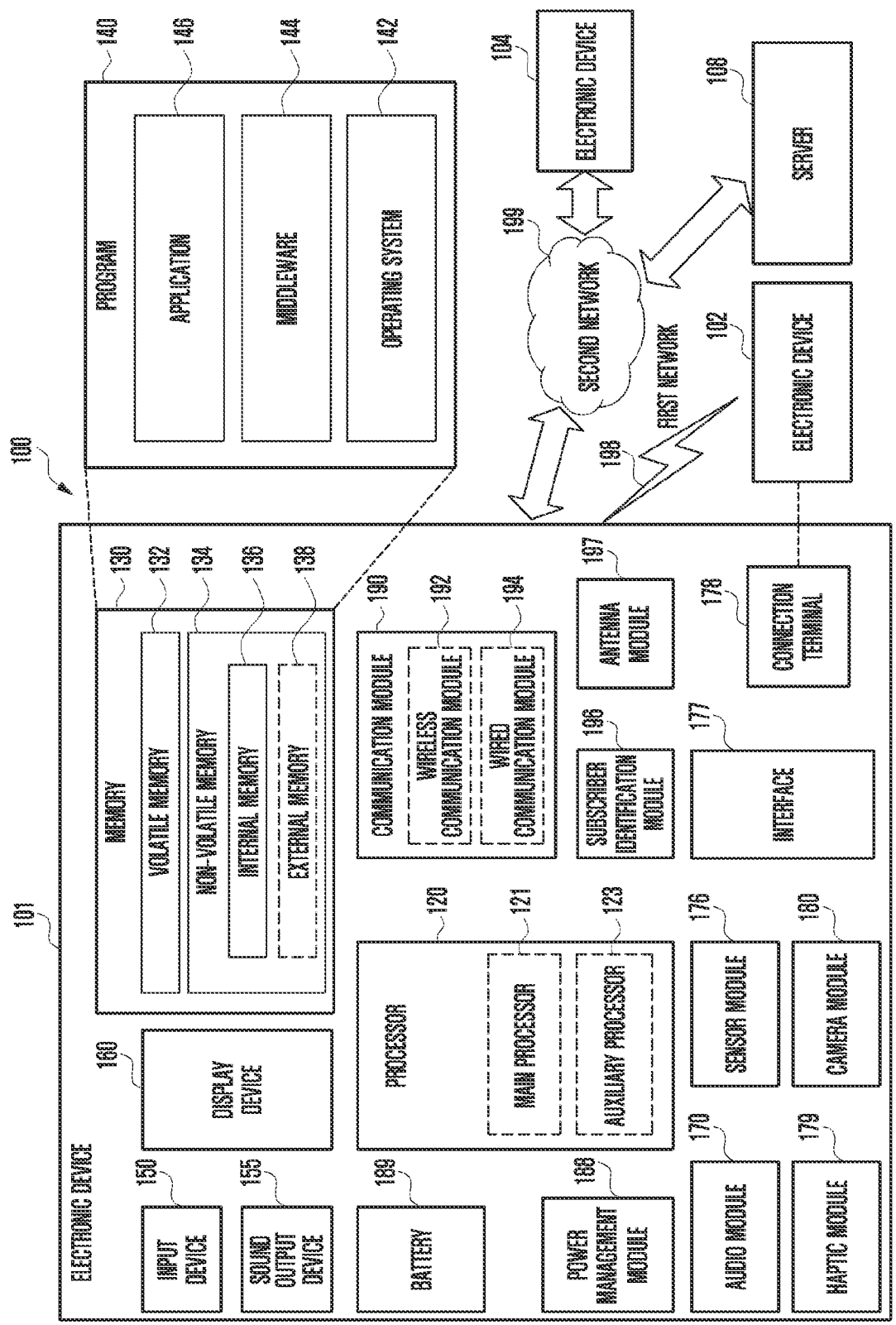
FIG. 1 is a diagram illustrating an example electronic device in a network environment according to various embodiments.

Hereinafter, various example embodiments are described in greater detail with reference to the accompanying drawings. Embodiments and terms used therefor are not intended to limit techniques described herein to specific embodiments but are construed to include various modifications, equivalents, and/or alternatives of the embodiments. In describing the drawings, like reference numerals may be used to refer to like elements. An expression used in the singular may encompass an expression in the plural unless the context clearly indicates otherwise.

FIG. 1 is a diagram illustrating an example electronic device in a network environment according to various embodiments. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
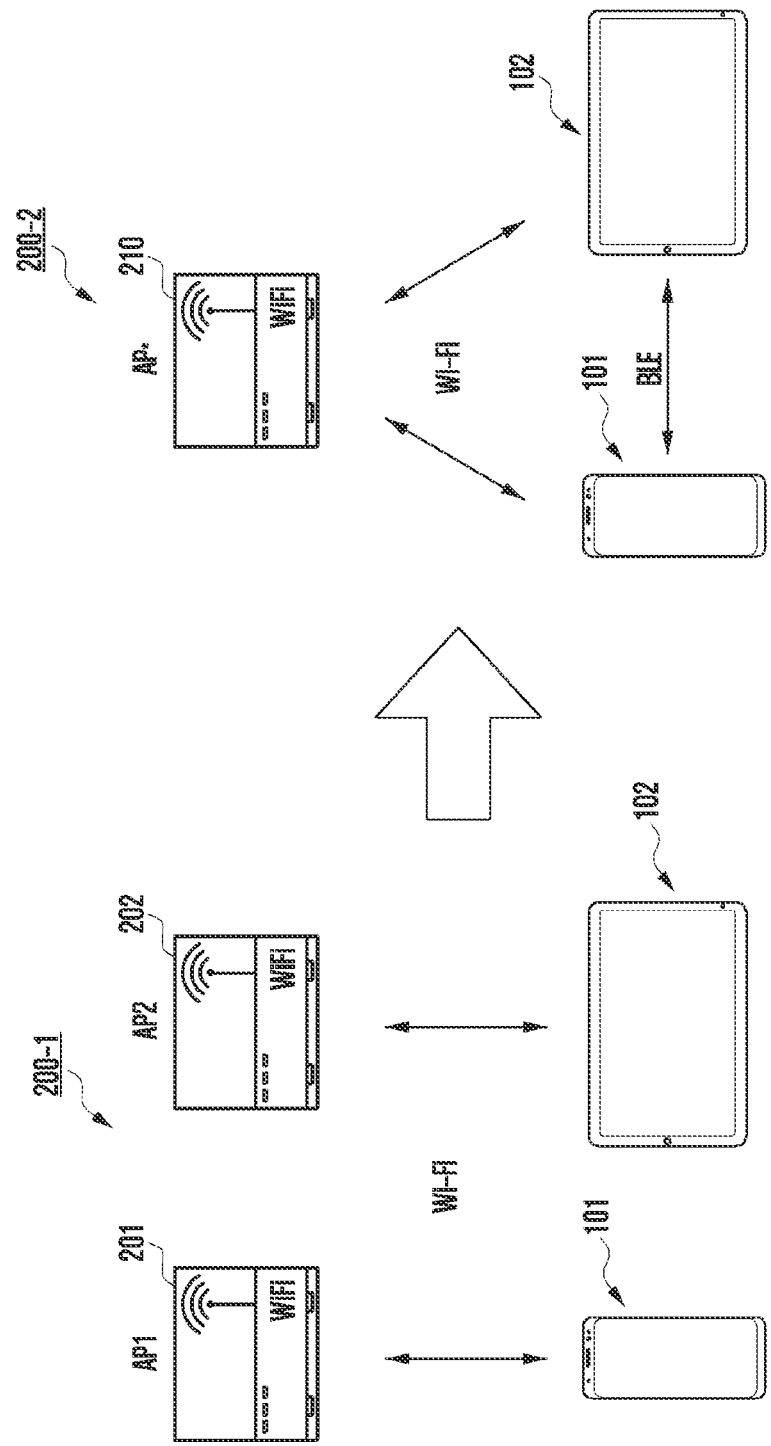
FIG. 2 is a diagram illustrating communication between an electronic device and an external electronic device through an AP according to various embodiments.

FIG. 2 is a diagram illustrating example communication between an electronic device and an external electronic device through an AP according to various embodiments.

Referring to reference numeral 200-1 of FIG. 2, the electronic device (e.g., the electronic device 101 of FIG. 1) may perform Wi-Fi communication with a server (e.g., the server 108 of FIG. 1) through a first access point (AP) 201, and the external electronic device (e.g., the electronic device 102 of FIG. 1) may perform Wi-Fi communication with the server 108 through a second AP 202. For example, the electronic device 101 may determine at least one AP having a high wireless communication performance among a plurality of APs located nearby, and may perform Wi-Fi communication with the server 108 using the determined AP. According to an embodiment, the electronic device 101 and the external electronic device 102 may include at least one same component and may support a Wi-Fi communication method and/or a Bluetooth Low Energy (BLE) communication method. For example, the electronic device 101 may include a portable electronic device, and the external electronic device 102 may include a tablet device, but the disclosure is not limited thereto.

Referring to reference numeral 200-2 of FIG. 2, the electronic device 101 and the external electronic device 102 may perform wireless communication with each other, based, for example, on the BLE communication method, which is a short-range wireless network. According to an embodiment, the electronic device 101 and the external electronic device 102 may be connected to a same AP 210 (e.g., AP*) and may share data with each other.

According to various embodiments, the electronic device 101 and the external electronic device 102 may share communication-related information, based on the BLE communication method, and may determine a same AP, based on the shared communication-related information. The electronic device 101 and the external electronic device 102 may perform Wi-Fi communication with each other, based on the determined same AP. The electronic device 101 and the external electronic device 102 may perform Wi-Fi communication, based on a same AP without going through a server. The electronic device 101 and the external electronic device 102 may provide a continuity service to a user. According to an embodiment, the continuity service may include a service sharing context information of the electronic device 101 with the external electronic device 102. For example, the continuity service enables an operation (e.g., an application operation) performed in the electronic device 101 to be continuously performed in the external electronic device 102. For example, it is possible to copy data onto a clipboard while working on a document in the electronic device 101 and to paste the data copied onto the clipboard into the external electronic device 102 as it is when working on the document in the external electronic device 102.

Figure 3:
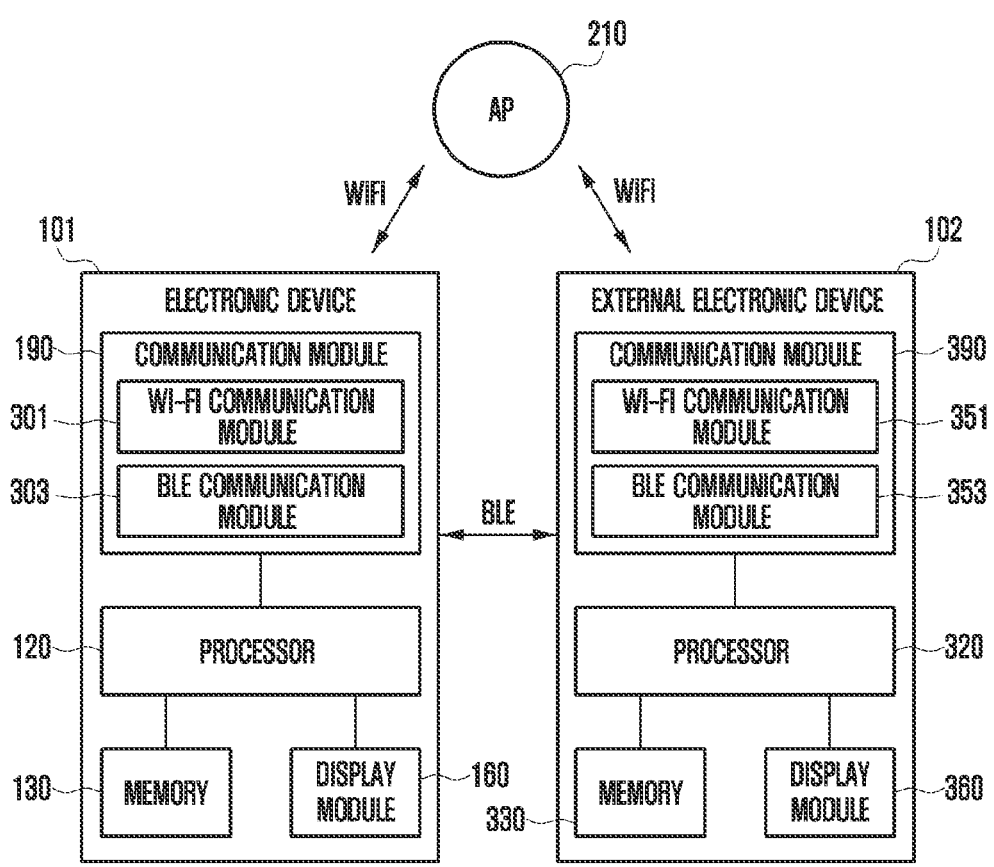
FIG. 3 is a block diagram illustrating an example configuration of an electronic device and an external electronic device according to various embodiments.

FIG. 3 is a block diagram illustrating an example configuration of an electronic device and an external electronic device according to various embodiments. The electronic device of FIG. 3 may be the electronic device 101 of FIG. 1.

Referring to FIG. 3, the electronic device 101 and the external electronic device 102 may perform wireless communication with a server (e.g., the server 108 of FIG. 1) through an access point (AP) 210, based on a Wi-Fi communication method. The electronic device 101 and the external electronic device 102 may include at least one same component and may support the Wi-Fi communication method (e.g., a first communication method) and/or a BLE communication method (e.g., a second communication method). The electronic device 101 and the external electronic device 102 may perform wireless communication with each other, based on the BLE communication method. According to an embodiment, the electronic device 101 and the external electronic device 102 may share communication-related information, based on the BLE communication method, and may determine a same AP 210, based on the shared communication-related information. The electronic device 101 and the external electronic device 102 may perform Wi-Fi communication with each other, based on the determined same AP 210. According to an embodiment, the electronic device 101 and the external electronic device 102 may provide a continuity service to a user according to the Wi-Fi communication method.

Referring to FIG. 3, the electronic device 101 may include a processor (e.g., including processing circuitry) 120 (e.g., the processor 120 of FIG. 1), a memory 130 (e.g., the memory 130 of FIG. 1), a display module (e.g., including a display) 160 (e.g., the display module 160 of FIG. 1), and/or a communication module (e.g., including communication circuitry) 190 (e.g., the communication module 190 of FIG. 1). The external electronic device 102 may include a processor (e.g., including processing circuitry) 320, a memory 330, a display module (e.g., including a display 360, and/or a communication module (e.g., including communication circuitry) 390. According to an embodiment, the electronic device 101 and the external electronic device 102 may include at least one same component.

According to an embodiment, the processor 120 of the electronic device 101 may include various processing circuitry and execute a program (e.g., the program 140 of FIG. 1) stored in the memory 130 to control at least one different component (e.g., hardware or software components) and may perform various types of data processing or operations. According to an embodiment, the processor 120 may store information about at least one access point (AP) located nearby in the memory 130. For example, the electronic device 101 may retrieve (or scan) an AP located nearby through a Wi-Fi communication module 301 and may store signal quality data about at least one AP, based on a retrieval result. According to an embodiment, the processor 120 may identify at least one communicable AP, may generate an AP list, and may store the AP list in the memory 130.

According to an embodiment, the display module 160 of the electronic device 101 may include a display and display a user interface for wireless communication. For example, when the electronic device 101 provides a continuity service with the external electronic device 102 to the user, the electronic device 101 may display a user interface related to the continuity service on the display module 160. According to an embodiment, a continuity service may be a service in which a user having a plurality of electronic devices shares context information about a first electronic device with a second electronic device. For example, when a document editing program is executed in the second electronic device while editing a document in the first electronic device, the document being edited in the first electronic device may directly continue and be displayed on the second electronic device, and document editing may be continuously performed in the second electronic device. In another example, when the first electronic device stores data in a clipboard of the first electronic device using a "copy" function and then the second electronic device performing the continuity service uses is used, the data stored in the clipboard of the first electronic device may be shared with the second electronic device. When the second electronic device executes a "paste" function, the data stored in the clipboard may be "pasted". According to an embodiment, when providing a continuity service to the user, the electronic device 101 may display a user interface related to the continuity service on the display module 160.

According to an embodiment, the electronic device 101 may perform wireless communication with the external electronic device (e.g., the electronic device 102 of FIG. 1) through the communication module (e.g., the communication module 190 of FIG. 1 or a wireless communication circuit). For example, the wireless communication may include various communication circuitry supporting long-range and/or short-range wireless communication, and may include Wi-Fi communication and/or BLE communication. Referring to FIG. 3, the communication module 190 may include the Wi-Fi communication module 301 including various Wi-Fi circuitry for performing Wi-Fi communication and/or a BLE communication module 303 including various BLE circuitry for performing BLE communication. According to an embodiment, the electronic device 101 may perform Wi-Fi communication with at least one AP (e.g., the AP 210) through the Wi-Fi communication module 301. According to an embodiment, the electronic device 101 may perform BLE communication with the external electronic device 102 through the BLE communication module 303.

According to an embodiment, the electronic device 101 may exchange a command and/or data with the external electronic device 102 using various communication methods included in the communication module 190, and may at least partly control the external electronic device 102 or may be at least partly controlled by the external electronic device 102. For example, when the electronic device 101 needs a continuity service with the external electronic device 102, the electronic device 101 may transmit a continuity service request signal to the external electronic device 102, and may at least partly control the external electronic device 102 so that the external electronic device 102 also provides the continuity service to the user.

Referring to FIG. 3, the external electronic device 102 may include at least one component that is the same as that of the electronic device 101. The external electronic device 102 may perform an operation that is at least partly the same as that of the electronic device 101. According to an embodiment, the external electronic device 102 may perform Wi-Fi communication and/or BLE communication through a Wi-Fi communication module (e.g., including Wi-Fi communication circuitry) 351 and a BLE communication module (e.g., including BLE communication circuitry) 353 included in the communication module 390. For example, the external electronic device 102 may perform Wi-Fi communication with at least one AP (e.g., the AP 210) through the Wi-Fi communication module 351. According to an embodiment, the external electronic device 102 may perform BLE communication with the electronic device 102 through the BLE communication module 353.

According to various embodiments, the electronic device 101 and the external electronic device 102 may perform wireless communication with each other, based on the BLE communication method. For example, when the external electronic device 102 moves closer to the electronic device 101 within a preset distance, the electronic device 101 may detect approach of the external electronic device 102 using the BLE communication module 303, based on the BLE communication method corresponding to a short-range communication network and may perform BLE communication with the external electronic device 102. According to an embodiment, the electronic device 101 and the external electronic device 102 may share communication-related information with each other, based on the BLE communication method. According to an embodiment, when the electronic device 101 and the external electronic device 102 are each in a state of performing Wi-Fi communication, the electronic device 101 may transmit Wi-Fi communication-related information corresponding to the electronic device 101 to the external electronic device 102 and may obtain Wi-Fi communication-related information corresponding to the external electronic device 102 from the external electronic device 102. According to an embodiment, the electronic device 101 may integrate communication-related information about the electronic device 101 and communication-related information about the external electronic device 102 to determine one AP (e.g., the AP 210), and may provide a continuity service between the electronic device 101 and the external electronic device 102 to the user, based on the determined one AP 210. The electronic device 101 and the external electronic device 102 may mutually perform wireless communication according to the Wi-Fi communication method, based on the same one AP (e.g., the AP 210).

According to various example embodiments, an electronic device may include a communication module comprising communication circuitry configured to support a first communication method (e.g., Wi-Fi communication) and a second communication method (e.g., BLE communication), a memory, and a processor operatively connected to the communication module and the memory. The processor may be configured to: control the electronic device to connect to a first AP included in a first AP list based on the first communication method, receive a signal based on the second communication method transmitted from an external electronic device, obtain account information about the external electronic device and a second AP list including information about a second AP connected with the external electronic device from the external electronic device based on the second communication method upon receiving the signal, determine an AP based on the first AP list and the second AP list based on account information about the electronic device and the account information about the external electronic device at least partly matching, and perform wireless communication with the external electronic device based on the first communication method through the determined AP.

According to an example embodiment, the processor may be configured to control the electronic device to: transmit the signal based on the second communication method to an outside based on a configured period, and receive a response signal corresponding to the signal from the external electronic device.

According to an example embodiment, the processor may be configured to: request communication information related to the external electronic device from the external electronic device based on the signal, and obtain the account information about the external electronic device and the second AP list including the information about the second AP from the external electronic device in response to a request.

According to an example embodiment, the processor may be configured to control the electronic device to: establish a connection for communication based on the second communication method with the external electronic device based on the signal, and obtain a packet including communication information related to the external electronic device from the external electronic device with which the connection for communication is established.

According to an example embodiment, the first AP list and the second AP list may include at least one of a service set identifier (SSID) for identifying at least one AP, a basic service set identifier (BSSID), a Wi-Fi channel number through which the at least one AP communicates, a Wi-Fi standard technology supportable by the at least one AP, physical location information about the at least one AP, information about at least one electronic device 101 connected to the at least one AP, information indicating whether the at least one AP is connectable, and/or information indicating whether the at least one AP is connected to an Internet.

According to an example embodiment, the processor may be configured to: determine the one AP, based on a signal quality of at least one AP included in the first AP list, a signal quality of at least one AP included in the second AP list, a preset priority corresponding to the at least one AP, a user preference, a communication record of the at least one AP, and/or a charge for the at least one AP.

According to an example embodiment, the signal quality of the at least one AP may be identified based on at least one piece of information among a received signal strength indicator (RSSI), channel utilization (CU), a modulation coding scheme (MCS), a signal-to-noise ratio (SNR), a channel busy ratio (CBR), and/or a packet error rate (PER) related to the at least one AP.

According to an example embodiment, the processor may be configured to: determine whether to execute a continuity service with the external electronic device upon receiving the signal based on the second communication method, may obtain list information of at least one electronic device being connected to the first AP from the first AP based on executing the continuity service, and to control the electronic device to perform wireless communication with the external electronic device based on the first communication method through the first AP based on the list information of the at least one electronic device including the external electronic device.

According to an example embodiment, the processor may be configured to control the electronic device to transmit a request signal for requesting a switch to the determined one AP to the external electronic device, and perform the wireless communication with the external electronic device based on the first communication method through the determined one AP based on the external electronic device switching to the one AP.

According to an example embodiment, the processor may be configured to: determine a different AP, based on the first AP list and the second AP list based on the external electronic device failing to switch to the one AP, and control the electronic device to transmit a request signal for requesting a switch to the determined different AP to the external electronic device.

According to various example embodiments, an external electronic device may include: a communication module comprising communication circuitry configured to support a first communication method (e.g., Wi-Fi communication) and a second communication method (e.g., BLE communication), a memory, and a processor operatively connected to the communication module and the memory. The processor may be configured to control the external electronic device to: connect to a first AP included in a first AP list based on the first communication method, receive a request signal transmitted from an electronic device based on the second communication method, transmit account information about the external electronic device and a first AP list including information about the connected first AP to the electronic device based on the second communication method upon receiving the request signal, switch the connected first AP to a second AP in response to a request signal for requesting a switch to the second AP, and perform wireless communication with the electronic device, based on the first communication method through the second AP.

According to an example embodiment, the processor may be configured to identify whether the first AP and the second AP are the same AP in response to the request signal for requesting the switch to the second AP, control the external electronic device to maintain a connection to the first AP based on the first AP and the second AP being the same AP, and switch the first AP to the second AP based on the first AP and the second AP being different APs.

According to an example embodiment, the processor may be configured to control the external electronic device to: transmit a request signal for selecting a different AP to the electronic device based on failing to switch from the first AP to the second AP, and switch the connected first AP to a third AP in response to a request signal for requesting a switch to the third AP determined by the electronic device.

FIG. 4 is a flowchart illustrating an example method in which an electronic device communicates with an external electronic device, based on an AP according to various embodiments. In the following embodiments, operations may be sequentially performed but are not necessarily sequentially performed. For example, the order of the operations may be changed, and at least two operations may be performed in parallel. According to an embodiment, the electronic device of FIG. 4 may include the electronic device 101 of FIG. 1 and/or the electronic device 101 of FIG. 3.

Referring to FIG. 4, in operation 401, the electronic device 101 may establish communication with a first AP on a connectable first AP list, based on a Wi-Fi communication method. The electronic device 101 may include a communication module (e.g., the communication module 190 of FIG. 1) including various communication circuitry for wireless communication and may perform Wi-Fi communication with at least one AP using a Wi-Fi communication module (e.g., the Wi-Fi communication module 301 of FIG. 3) included in the communication module 190. For example, the electronic device 101 may perform a scan operation using the Wi-Fi communication module 310, may identify information related to at least one currently connectable AP, and may store the identified information as the first AP list in a memory (e.g., the memory 130 of FIG. 1). The first AP list may include information about at least one AP to which the electronic device 101 is connectable and signal quality information corresponding to the at least one AP. According to an embodiment, the electronic device 101 may determine one AP (e.g., the AP 210 of FIG. 3), based on the first AP list. For example, the electronic device 101 may identify signal quality information corresponding to at least one AP included in the first AP list and may determine an AP having the highest signal quality, based on the identified signal quality information. The electronic device 101 may perform Wi-Fi communication with a server (e.g., the server 108 of FIG. 1), based on the determined AP.

In operation 403, the electronic device 101 may identify approach of the external electronic device 102. According to an embodiment, the electronic device 101 may perform BLE communication with the external electronic device 102 using a BLE communication module (e.g., the BLE communication module 303 of FIG. 3) included in the communication module 190. BLE communication is short-range network wireless communication and may include low-power wireless communication between electronic devices located within a set range. For example, when the electronic device 101 operates as an advertiser, the electronic device 101 may transmit a BLE advertisement signal to neighbors, based on a predetermined period. The external electronic device 102 may operate as a scanner and may periodically perform a BLE signal scanning operation to receive the BLE advertisement signal transmitted from the electronic device 101. When receiving the BLE advertisement signal, the external electronic device 102 may transmit a response signal corresponding to the BLE advertisement signal to the electronic device 101. When the electronic device 101 receives the response signal, the electronic device 101 may identify that the external electronic device 102 has approached within a BLE communication range.

In operation 405, the electronic device 101 may obtain account information corresponding to the external electronic device 102 and a second AP list through a BLE communication method in response to approach of the external electronic device 102. According to an embodiment, the external electronic device 102 may include a communication module (e.g., the communication module 390 of FIG. 3) for wireless communication, and the communication module 390 may include a Wi-Fi communication module (e.g., the Wi-Fi communication module 351 of FIG. 3) and/or a BLE communication module (e.g., the BLE communication module 353 of FIG. 3). According to an embodiment, the external electronic device 102 may also perform Wi-Fi communication with one AP using the Wi-Fi communication module 351. For example, the external electronic device 102 may perform a scan operation using the Wi-Fi communication module 351, may identify information related to at least one currently connectable AP, and may store the identified information as the second AP list in a memory (e.g., the memory 330 of FIG. 3). The second AP list may include information about at least one AP to which the external electronic device 102 is connectable and signal quality information corresponding to the at least one AP. According to an embodiment, the external electronic device 102 may receive a BLE advertisement signal transmitted from the electronic device 101 while performing Wi-Fi communication through one AP, and may transmit a response signal to the BLE advertisement signal to the electronic device 101.

In operation 405, when receiving a response signal transmitted from the external electronic device 102, the electronic device 101 may request communication-related information about the external electronic device 102 from the external electronic device 102. In response to the request, the external electronic device 102 may provide the account information corresponding to the external electronic device 102 and the second AP list to the electronic device 101, and the electronic device 101 may obtain the account information and the second AP list.

In operation 407, the electronic device 101 may identify a signal quality of at least one AP, based on the first AP list related to the electronic device 101 and the second AP list related to the external electronic device 102. According to an embodiment, the AP lists may include at least one of a service set identifier (SSID) for identifying at least one AP, a basic service set identifier (BSSID), a Wi-Fi channel number through which the AP communicates, a Wi-Fi standard technology supported by the AP, physical location information about the AP, information about at least one electronic device connected to the AP, information indicating whether the AP is connectable, and/or information indicating whether the AP is connected to the Internet. According to an embodiment, the AP lists may include at least one piece of information among a received signal strength indicator (RSSI) indicating signal quality, channel utilization (CU), a modulation coding scheme (MCS), a signal-to-noise ratio (SNR), a channel busy ratio (CBR), and/or a packet error rate (PER). In operation 407, the electronic device 101 may identify the signal quality of the at least one AP, based on at least some of the foregoing pieces of information included in the first AP list and/or the second AP list.

In operation 409, the electronic device 101 may determine one AP, based on the signal quality. For example, the electronic device 101 may determine an AP having the highest signal quality with respect to Wi-Fi communication between the electronic device 101 and the external electronic device 102, based on the first AP list and/or the second AP list.

In operation 411, the electronic device 101 may perform wireless communication with the external electronic device 102 through the determined AP, based on the Wi-Fi communication method. The electronic device 101 may perform Wi-Fi communication with the external electronic device 102, based on the same one AP. According to an embodiment, the electronic device 101 may perform wireless communication with the external electronic device 102, based on one AP without intervention of an external server according to the Wi-Fi communication method. The electronic device 101 and the external electronic device 102 may provide a continuity service to a user. According to an embodiment, the electronic device 101 may transmit information about the determined AP to the external electronic device 102. For example, the determined AP may be an AP to which the external electronic device 102 is currently connected or a different AP included in the second AP list. The external electronic device 102 may perform wireless communication with the electronic device 102, based on the determined AP according to the Wi-Fi communication method.

FIG. 5 is a signal flow diagram illustrating an example method in which an electronic device and an external electronic device execute a continuity service using one AP according to various embodiments. Referring to FIG. 5, the electronic device (e.g., the electronic device 101 of FIG. 1) and the external electronic device (e.g., the electronic device 102 of FIG. 1) may support a Wi-Fi communication method (e.g., a first communication method) and/or a BLE communication method (e.g., a second communication method).

In operation 501, the electronic device 101 may be operatively connected (e.g., communicatively connected) to a first AP, based on the Wi-Fi communication method. For example, the electronic device 101 may select the first AP, based on a first AP list including at least one AP connectable with the electronic device 101, and may be operatively connected to the first AP. According to an embodiment, the electronic device 101 may retrieve at least one AP located adjacently to the electronic device 101 using a Wi-Fi communication module 301, and may be communicatively connected with an AP (e.g., the first AP) having the best specified condition (e.g., signal quality) among the at least one retrieved AP. The electronic device 101 may store the first AP list including the at least one retrieved AP in a memory (e.g., the memory 130 of FIG. 1).

In operation 503, the external electronic device 102 may be operatively connected (e.g., communicatively connected) to a second AP, based on the Wi-Fi communication method. For example, the external electronic device 102 may select the second AP, based on a second AP list including at least one AP connectable with the external electronic device 102, and may be operatively connected to the second AP. According to an embodiment, the external electronic device 102 may retrieve at least one AP located adjacently to the external electronic device 102 using a Wi-Fi communication module 351, and may be communicatively connected with an AP (e.g., the second AP) having the best specified condition (e.g., signal quality) among the at least one retrieved AP. The external electronic device 102 may store the second AP list including the at least one retrieved AP in a memory (e.g., the memory 330 of FIG. 3).

According to an embodiment, the electronic device 101 and the external electronic device 102 may support the Wi-Fi communication method and/or the BLE communication method and may independently perform Wi-Fi communication and/or BLE communication. Referring to FIG. 5, operation 505 to operation 519 illustrate BLE communication 530 between the electronic device 101 and the external electronic device 102, and operation 525 to operation 527 illustrate Wi-Fi communication 540 between the electronic device 101 and the external electronic device 102.

According to an embodiment, the electronic device 101 and the external electronic device 102 may be in a state of activating a continuity service application for providing a continuity service to a user. For example, the electronic device 101 and the external electronic device 102 may be in the state of activating the continuity service application in the background, and may perform operation 505 when the continuity service application is activated.

In operation 505, the electronic device 101 may identify approach of the external electronic device 102. For example, the electronic device 101 serving as an advertiser may transmit a BLE advertisement signal for BLE communication to neighbors. When the external electronic device 102 enters a BLE communication range of the electronic device 101, the external electronic device 102 may receive the BLE advertisement signal and may transmit a response signal to the BLE advertisement signal to the electronic device 101. According to an embodiment, upon receiving the response signal, the electronic device 101 may identify that the external electronic device 102 approaches within the BLE communication range.

In operation 507, the electronic device 101 may transmit a signal for requesting communication information about the external electronic device 102 to the external electronic device 102. According to an embodiment, the electronic device 101 may include the request signal in the BLE advertisement signal and may transmit the BLE advertisement signal to the external electronic device 102. According to an embodiment, in response to the approach of the external electronic device 102, the electronic device 101 may establish a connection for BLE communication with the external electronic device 102 and may transmit the request signal to the external electronic device 102.

In operation 509, the external electronic device 102 may generate a BLE packet. For example, the BLE packet may include account information about the external electronic device 102, information related to the second AP performing Wi-Fi communication, and/or the second AP list including the at least one AP connectable based on the external electronic device 102. According to an embodiment, the electronic device 101 may request Wi-Fi communication-related information about the external electronic device 102 from the external electronic device 102, based on the BLE communication 530, and may obtain the Wi-Fi communication-related information from the external electronic device 102. According to an embodiment, the electronic device 101 may establish a connection for Wi-Fi communication with the external electronic device 102 and may provide a continuity service to the user, based on the Wi-Fi communication method. According to an embodiment, the external electronic device 102 may generate the BLE packet when the approach of the electronic device 101 is identified, without a process of requesting the communication information in operation 507.

According to an embodiment, when receiving a BLE packet generated and transmitted by the electronic device 101, the external electronic device 102 may identify the approach of the electronic device 101, and accordingly the external electronic device 102 may generate and transmit the BLE packet to the electronic device 101. For example, the BLE packet generated and transmitted by the electronic device 101 to the external electronic device 102 may include account information about the electronic device 101, information related to the first AP performing Wi-Fi communication, and/or the first AP list including the at least one AP connectable based on the electronic device 101.

In operation 511, the external electronic device 102 may transmit the BLE packet generated in operation 509 to the electronic device 101. According to an embodiment, when receiving the BLE advertisement signal from the electronic device 101, the external electronic device 102 may transmit the response signal including the BLE packet to the BLE advertisement signal to the electronic device 101. According to an embodiment, after the connection for the BLE communication with the electronic device 101 is established, when receiving the request signal, the external electronic device 102 may include the BLE packet in a response signal to the request signal and may transmit the response signal to the electronic device 101.

According to an embodiment, a process in which the electronic device 101 requests the communication information from the external electronic device 102 (e.g., operation 507) may be omitted, and operation 505 in which the electronic device 101 identifies the approach of the external electronic device 102 by receiving the packet generated and transmitted by the external electronic device 102 may be performed. For example, the external electronic device 102 may perform operation 511 of transmitting the BLE packet generated in operation 509 to neighbors, and the electronic device 101 may identify the approach of the external electronic device 102, based on the BLE packet received from the external electronic device 102. According to an embodiment, operation 505 and operation 507 may be omitted, and the electronic device 101 may identify whether the external electronic device 102 approaches by receiving the BLE packet from the external electronic device 102 in operation 511.

In operation 513, the electronic device 101 may compare the account information about the electronic device 101 with the account information about the external electronic device 102, thereby identifying whether the pieces of account information at least partly match. According to an embodiment, the electronic device 101 may be in the state of activating the continuity service application for providing the continuity service to the user in the background. When the continuity service application is in an active state, the electronic device 101 may identify the account information about the electronic device 101 and the account information about the external electronic device 101 in operation 513.

When the account information about the electronic device 101 at least partial matches the account information about the external electronic device 102 in operation 513, the electronic device 101 may compare a signal quality of at least one AP included in the AP lists (e.g., the first AP list and/or the second AP list) in operation 515. For example, the first AP list may include the information related to the at least one AP connectable based on the electronic device 101, and the second AP list may include the information related to the at least one AP connectable based on the external electronic device 102. According to an embodiment, the AP list may include signal quality information related to a communication network. For example, the signal quality information may include at least one of a received signal strength indicator (RSSI), channel utilization (CU), a modulation coding scheme (MCS), a signal-to-noise ratio (SNR), a channel busy ratio (CBR), and/or a packet error rate (PER). The signal quality information may also include information processed using at least one of the foregoing pieces of information. In operation 515, the electronic device 101 may compare and/or analyze the signal quality corresponding to the at least one AP, based on the first AP list and the second AP list.

In operation 517, the electronic device 101 may determine one AP. For example, the electronic device 101 may select an AP having the highest signal quality with respect to the electronic device 101 or may select an AP having the highest signal quality collectively for the electronic device 101 and the external electronic device 102. According to an embodiment, in providing the continuity service to the user, the electronic device 101 may determine one AP that provides the best communication environment. According to an embodiment, the electronic device 101 may determine one AP in view of the location and mobility of the electronic device 101 and/or the external electronic device 102. For example, when the electronic device 101 is moving in a direction to the external electronic device 102, the electronic device 101 may determine one AP by applying a weight to the second AP list. According to an embodiment, the electronic device 101 and the external electronic device 102 may access the determined one AP substantially at the same time, and may share context information with each other. The continuity service may be provided to the user, based on the shared context information.

In operation 519, the electronic device 101 may transmit information about the determined one AP to the external electronic device 102. According to an embodiment, the electronic device 101 may determine whether the determined one AP is the same as the second AP being connected to the external electronic device 101, and may transmit a request signal for changing the second AP being connected to the determined one AP to the external electronic device 101 when the determined one AP is different from the second AP. According to an embodiment, the electronic device 101 may transmit the information about the determined one AP and the request signal for changing the AP to the external electronic device 102 through BLE communication. According to an embodiment, although not shown, the external electronic device 102 may determine a change to the determined one AP in response to the request signal, and may transmit a response signal to the request signal to the electronic device 101. For example, the external electronic device 102 may transmit an affirmative (or accepting) response signal when it is possible to change to the determined one AP, and may transmit a negative (or rejecting) response signal when it is impossible to change to the determined one AP. In another example, the external electronic device 102 may transmit a negative (or rejecting) response signal when it is impossible to change to the determined one AP, and may not transmit a response signal when it is possible to change to the determined one AP.

In operation 521, the electronic device 101 may determine whether to change or maintain the first AP connected in operation 501, based on the determined one AP. In operation 523, the external electronic device 102 may determine whether to change or maintain the second AP connected in operation 503, based on the determined one AP.

For example, when the determined one AP is different from the first AP, the electronic device 101 may change the AP (e.g., the first AP) connected based on Wi-Fi communication to the determined one AP. When the determined one AP is the same as the first AP, the electronic device 101 may maintain the AP connected based on Wi-Fi communication as the first AP. For example, in the case of the external electronic device 102, when the determined one AP is different from the second AP, the external electronic device 102 may change the AP (e.g., the second AP) connected based on Wi-Fi communication to the determined one AP. When the determined one AP is the same as the second AP, the external electronic device 102 may maintain the AP connected based on Wi-Fi communication as the second AP.

In operation 525, the electronic device 101 and the external electronic device 102 may access the determined one AP substantially at the same time and may execute the continuity service. For example, context information in the electronic device 101 may be transmitted to the external electronic device 102, and a job in the electronic device 101 may be continuously performed in the external electronic device 102.

According to an embodiment, the electronic device 101 and the external electronic device 102 may perform wireless communication based on the Wi-Fi communication method through the same one AP. In operation 527, the electronic device 101 and the external electronic device 102 may share continuity service-related information based on the Wi-Fi communication method.

According to various embodiments, the electronic device 101 and the external electronic device 102 may share communication-related information (e.g., information related to at least one connectable AP), based on the BLE communication method 530 and may determine one AP having a high signal quality, based on the communication-related information. The electronic device 101 and the external electronic device 102 may perform a continuity service through the determined one AP, based on the Wi-Fi communication method 540. According to an embodiment, the electronic device 101 and the external electronic device 102 may share continuity service-related information, and a job being performed in the electronic device 101 may be continuously performed in the external electronic device 102.

According to an embodiment, when the electronic device 101 and the external electronic device 102 fail to switch to the determined AP in a process of switching to the AP, the electronic device 101 and the external electronic device 102 may additionally determine at least one different AP and may reattempt an AP switch process. For example, when determining that it is impossible to provide the continuity service through the determined AP, the electronic device 101 may select a next-best AP instead of the determined AP in operation 517, may transmit the next-best AP to the external electronic device 102, and may reattempt an AP switch process. According to an embodiment, when it is impossible to switch to the AP determined by the electronic device 101, the external electronic device 102 may select a different AP, based on the AP list (e.g., the first AP list) received from the electronic device 101 and may transmit the different AP to the electronic device 101.

Figure 6A:
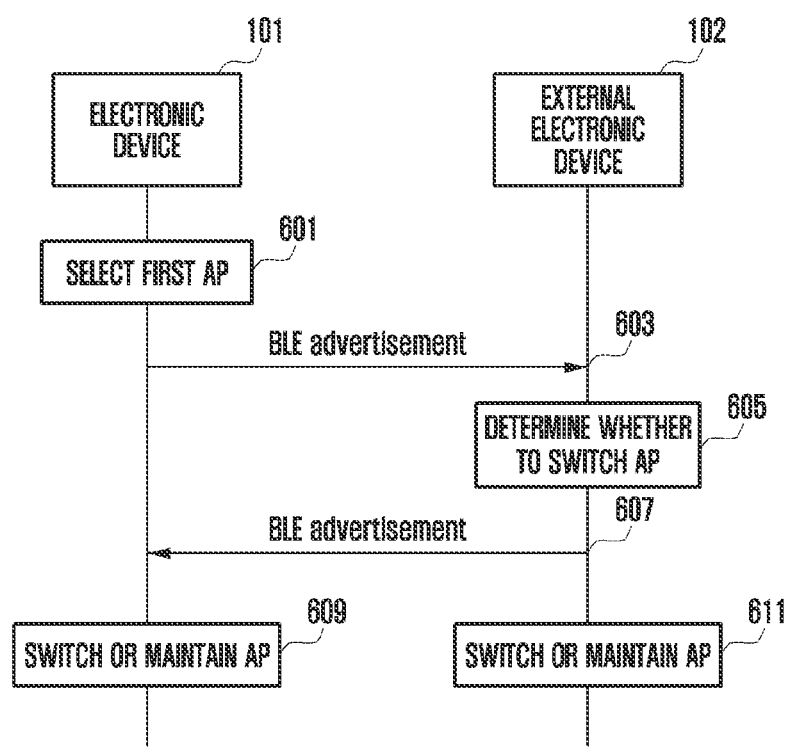
FIG. 6A is a signal flow diagram illustrating an example process in which an electronic device and an external electronic device exchange information using a BLE advertisement signal according to various embodiments.

FIG. 6A is a signal flow diagram illustrating an example process in which an electronic device and an external electronic device exchange information using a BLE advertisement signal according to various embodiments. FIG. 6A illustrates an example in which the electronic device 101 and the external electronic device 102 transmit and receive data using a BLE advertisement signal in a state in which a connection for communication according to a BLE communication method is not established.

According to an embodiment, the electronic device 101 and the external electronic device 102 may transmit and receive a BLE advertisement signal according to BLE communication, and may transmit and receive the BLE advertisement signal to which AP-related information is added. For example, the electronic device 101 may operate as an advertiser, and the external electronic device 102 may operate as a scanner. For BLE communication, the electronic device 101 may transmit the BLE advertisement signal to neighbors, based on a predetermined period. The external electronic device 102 may periodically perform a BLE signal scanning operation (e.g., BLE signal retrieval) to receive the BLE advertisement signal. When receiving the BLE advertisement signal, the external electronic device 102 may transmit a response signal corresponding to the BLE advertisement signal to the electronic device 101. According to an embodiment, the AP-related information may include at least one of a SSID for identifying at least one AP, a BSSID, a Wi-Fi channel number through which the AP communicates, a Wi-Fi standard technology supportable by the AP, physical location information about the AP, information about at least one electronic device connected to the AP, information indicating whether the AP is connectable, and/or information indicating whether the AP is connected to the Internet. The electronic device 101 and the external electronic device 102 may exchange a BLE advertisement signal including information related to at least one AP through BLE communication.

Referring to FIG. 6A, in operation 601, the electronic device 101 may select a first AP according to a Wi-Fi communication method. For example, operation 601 may be included in operation 517 of FIG. 5. In operation 603, the electronic device 101 may periodically transmit a BLE advertisement signal including information related to the selected first AP, and the external electronic device 102 may receive the BLE advertisement signal. In operation 605, the external electronic device 102 may determine whether to switch an AP, based on the information related to the first AP included in the BLE advertisement signal. Although not shown, the external electronic device 102 may also be in a state in which a second AP according to the Wi-Fi communication method is selected. In operation 607, the external electronic device 102 may transmit a response signal (e.g., a BLE advertisement signal) to the BLE advertisement signal received in operation 603 to the electronic device 101. For example, the external electronic device 102 may transmit a response signal indicating that the external electronic device 102 performs a switch to the first AP to the electronic device 101, based on information about the result of selecting the first AP received from the electronic device 101. According to an embodiment, in operation 609, the electronic device 101 may maintain the selection of the first AP when identifying the response signal indicating that the external electronic device 102 performs the switch to the first AP transmitted from the external electronic device 102. According to an embodiment, when the external electronic device 102 transmits a response signal indicating that the external electronic device 102 performs a switch to a different AP, the electronic device 101 may determine to switch to the different AP. According to an embodiment, after transmitting the response signal indicating that the external electronic device 102 performs the switch to the first AP, the external electronic device 102 may perform the switch to the AP in operation 611.

According to an embodiment, a process in which the electronic device 101 and the external electronic device 102 maintain or switch the AP according to operation 609 and operation 611 may be included in operation 521 and operation 523 of FIG. 5.

According to an embodiment, the electronic device 101 and the external electronic device 102 may share information related to Wi-Fi communication, based on the BLE communication method, may determine one AP having a high signal quality, based on the shared information, and may perform Wi-Fi communication, based on the determined one AP. The electronic device 101 and the external electronic device 102 may access the same one AP substantially at the same time and may perform a continuity service based on the Wi-Fi communication method through the one AP. According to an embodiment, the electronic device 101 may provide the continuity service to a user.

According to an embodiment, when the electronic device 101 fails to add both information related to the electronic device 101 and information related to the first AP to the BLE advertisement signal (e.g., a BLE advertisement packet), the electronic device 101 may add flag information indicating that there is additional information to be transmitted to the BLE advertisement signal. When receiving the BLE advertisement signal to which the flag information is added, the external electronic device 102 may transmit a request signal for requesting the additional information to the electronic device 101. The electronic device 101 may transmit an additional BLE advertisement signal to the external electronic device 102 in response to the request signal.

Figure 6B:
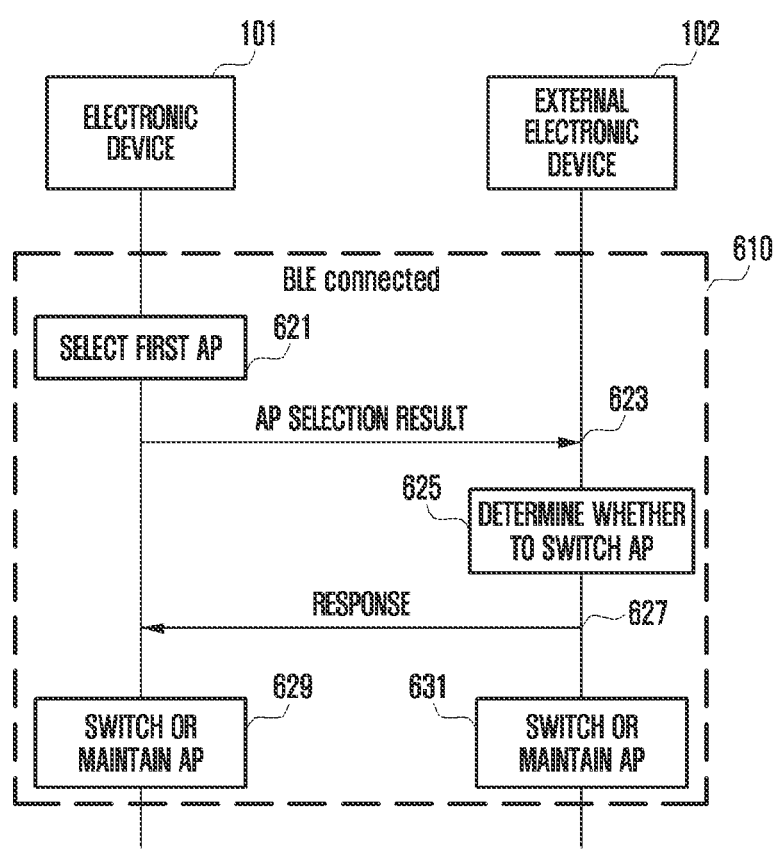
FIG. 6B is a signal flow diagram illustrating an example process in which an electronic device and an external electronic device exchange information after being connected according to a BLE communication method according to various embodiments.

FIG. 6B is a signal flow diagram illustrating an example process in which an electronic device and an external electronic device exchange information after being connected according to a BLE communication method according to various embodiments.

According to an embodiment, the electronic device 101 and the external electronic device 102 may establish a BLE connection 610, based on the BLE communication method. With the BLE connection 610 established, the electronic device 101 and the external electronic device 102 may transmit and receive a BLE packet corresponding to the BLE connection and may share communication-related information with each other.

Referring to FIG. 6B, in operation 621, the electronic device 101 may select a first AP according to a Wi-Fi communication method. For example, operation 621 may be included in operation 517 of FIG. 5. In operation 623, the electronic device 101 may transmit a BLE packet including information about the result of selecting the first AP to the external electronic device 102. With the BLE connection established, the electronic device 101 and the external electronic device 102 may transmit and receive a BLE packet with each other. In operation 625, the external electronic device 102 may determine whether to switch the AP, based on the result of selecting the first AP included in the BLE packet. Although not shown, the external electronic device 102 may also be in a state in which a second AP according to the Wi-Fi communication method is selected. In operation 627, the external electronic device 102 may transmit a response signal to the BLE packet in operation 623 to the electronic device 101. For example, the external electronic device 102 may transmit a response signal indicating that the external electronic device 102 performs a switch to the first AP to the electronic device 101, based on the received information about the result of selecting the first AP. In operation 629, the electronic device 101 may switch or maintain the selection of the first AP when identifying the response signal indicating that the external electronic device 102 performs the switch to the first AP transmitted from the external electronic device 102. According to an embodiment, when the external electronic device 102 transmits a response signal indicating that the external electronic device 102 performs a switch to a different AP, the electronic device 101 may determine to switch to the different AP. According to an embodiment, after transmitting the response signal indicating that the external electronic device 102 performs the switch to the first AP in operation 627, the external electronic device 102 may maintain the AP or perform the switch to the AP in operation 631.

According to an embodiment, a process in which the electronic device 101 and the external electronic device 102 maintain or switch the AP according to operation 629 and operation 631 may be included in operation 521 and operation 523 of FIG. 5.

According to an embodiment, the electronic device 101 and the external electronic device 102 may establish a BLE connection, based on BLE communication, and may share a BLE packet (e.g., information about the result of selecting one AP) with the BLE connection established. The electronic device 101 and the external electronic device 102 may access the same one AP at the same time and may perform Wi-Fi communication through the same one AP. The electronic device 101 and the external electronic device 102 may access the same one AP substantially at the same time and may perform a continuity service based on the Wi-Fi communication method through the one AP. According to an embodiment, the electronic device 101 may provide the continuity service to a user.

Referring to FIG. 6A and FIG. 6B, the electronic device 101 according to an embodiment may transmit information related to one selected AP to the external electronic device 102 using a BLE advertisement signal, and the external electronic device 102 may transmit a BLE packet according to a BLE connection to the electronic device 101 as a response signal to the BLE advertisement signal. For example, the electronic device 101 may transmit a BLE advertisement signal including the information related to the selected one AP to the external electronic device 102, and a BLE connection may be established between the electronic device 101 and the external electronic device 102. With the BLE connection established, the external electronic device 102 may transmit a response signal to the BLE advertisement signal to the electronic device 101 via a BLE packet.

Figure 7A:
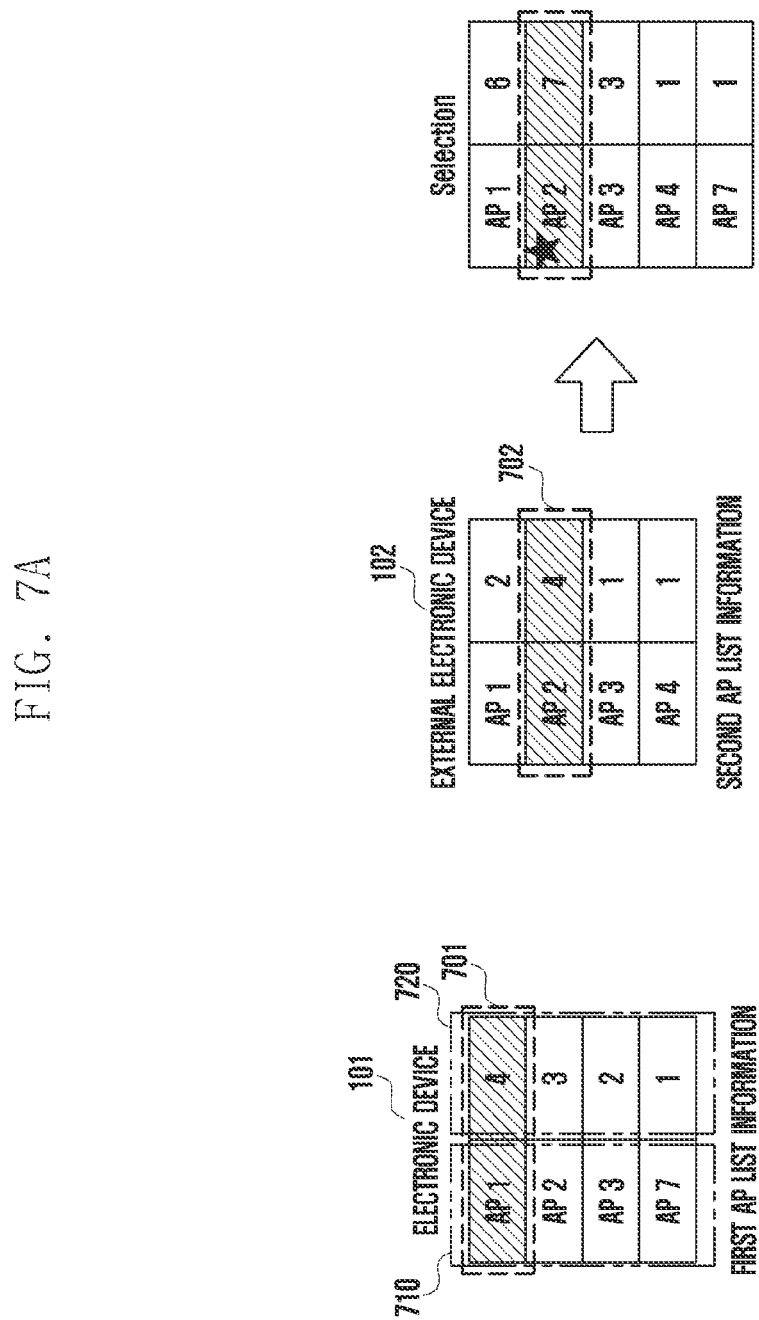
FIG. 7A is a diagram illustrating a first example in which an electronic device and an external electronic device select the same AP according to various embodiments.

FIG. 7A is a diagram illustrating a first example in which an electronic device and an external electronic device select one AP according to various embodiments.

Referring to FIG. 7A, the electronic device 101 may generate first AP list information including information 710 about at least one AP connectable based on the electronic device 101 and signal quality information 720 corresponding to the at least one AP. For example, the electronic device 101 may access AP 1, AP 2, AP 3, and/or AP 7, can perform wireless communication corresponding to a signal quality of 4 when selecting AP 1, and can perform wireless communication corresponding to a signal quality of 3 when selecting AP 2. For example, the greater the signal quality information 720 is, the higher the signal quality may be. The electronic device 101 may perform Wi-Fi communication through AP 1 701 having the highest signal quality, based on the first AP list information.

According to an embodiment, signal quality information corresponding to each AP may be numerically obtained. For example, the signal quality information about the at least one AP may include at least one piece of information among a received signal strength indicator (RSSI), channel utilization (CU), a modulation coding scheme (MCS), a signal-to-noise ratio (SNR), a channel busy ratio (CBR), and/or a packet error rate (PER). The electronic device 101 may numerically express the signal quality information corresponding to each AP, based on data included in the signal quality information.

Referring to FIG. 7A, the external electronic device 102 may generate second AP list information including information about at least one AP connectable based on the external electronic device 102 and signal quality information corresponding to the at least one AP. For example, the external electronic device 102 may access AP 1, AP 2, AP 3, and/or AP 4, can perform wireless communication corresponding to a signal quality of 4 when selecting AP 2, and can perform wireless communication corresponding to a signal quality of 2 when selecting AP 1. The external electronic device 102 may perform Wi-Fi communication through AP 2 702 having the highest signal quality, based on the second AP list information.

Referring to FIG. 7A, the electronic device 101 may obtain the second AP list information from the external electronic device 102 through BLE communication and may compare/analyze the first AP list information and the second AP list information. According to an embodiment, the electronic device 101 may generate one piece of AP list information by integrating the two pieces of list information and may determine one AP having the highest signal quality in the one piece of AP list information. For example, the electronic device 101 may add up values indicating a signal quality, based on the first AP list information and the second AP list information, and may select an AP (e.g., AP 2 702) having the highest signal quality. Referring to FIG. 7A, the electronic device 101 may determine one AP 2 702 (e.g., *AP2) having the highest signal quality, based on the one piece of AP list information, and may perform Wi-Fi communication using the determined one AP 2 702 (e.g., a signal quality number of 7). According to the example of FIG. 7A, the electronic device 101 may determine AP 2 702 being connected with the external electronic device 102 as an AP for providing a continuity service, based on the first AP list information of the electronic device 101 and the second AP list information of the external electronic device 102. For example, the electronic device 101 and the external electronic device 102 may provide a continuity service to the user, based on the same one AP (e.g., *AP 2). In this case, the electronic device 101 may change an AP to perform Wi-Fi communication through a Wi-Fi communication module (e.g., the Wi-Fi communication module 301 of FIG. 3) from AP 1 701 to AP 2 702.

Figure 7B:
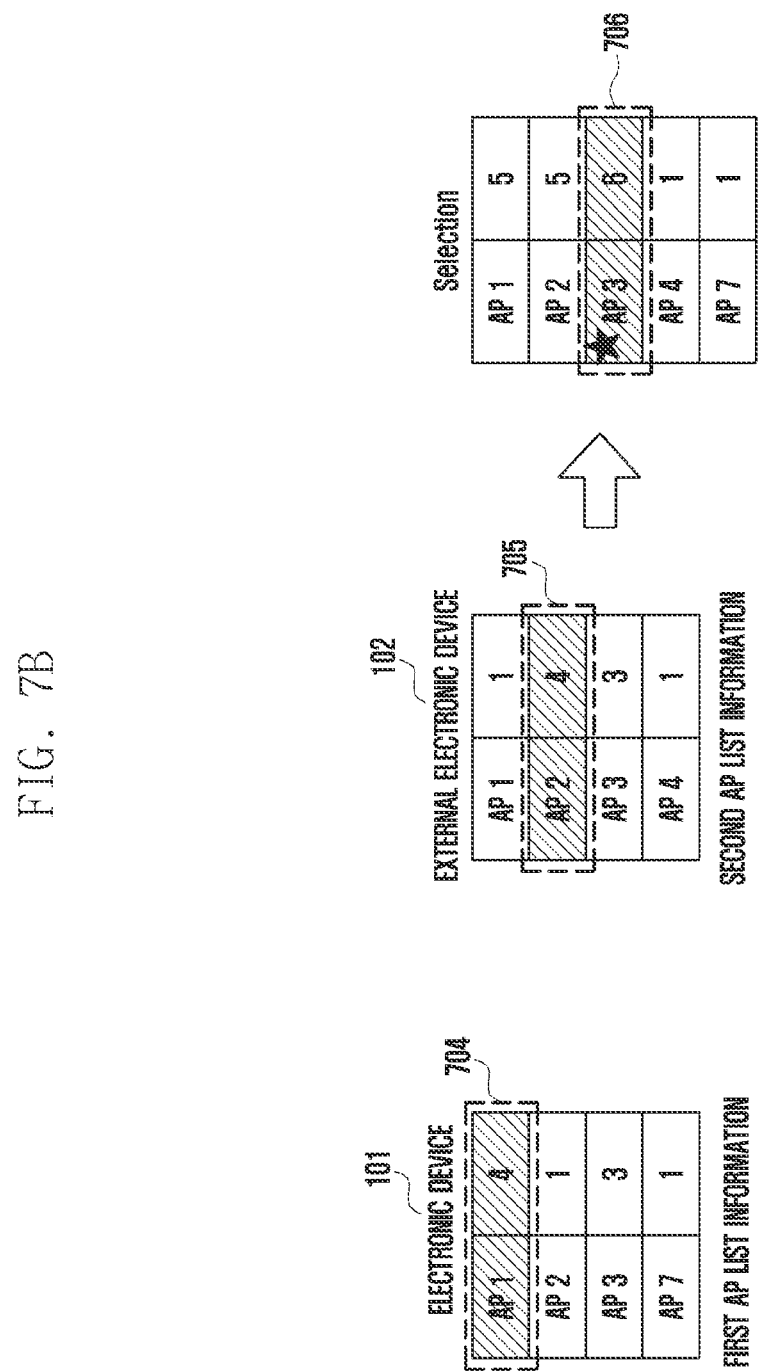
FIG. 7B is a diagram illustrating a second example in which an electronic device and an external electronic device select the same AP according to various embodiments.

FIG. 7B is a diagram illustrating a second example in which an electronic device and an external electronic device select one AP according to various embodiments.

Referring to FIG. 7B, the electronic device 101 may generate first AP list information related to at least one AP connectable based on the electronic device 101, and the external electronic device 102 may generate second AP list information related to at least one AP connectable based on the external electronic device 102.

Referring to FIG. 7B, the electronic device 101 may perform Wi-Fi communication through AP 1 704 having a signal quality value of 4, based on the first AP list information. The external electronic device 102 may perform Wi-Fi communication through AP 2 705 having a signal quality value of 4, based on the second AP list information.

Referring to FIG. 7B, the electronic device 101 may compare and/or analyze the first AP list information and the second AP list information. According to an embodiment, the electronic device 101 may generate one piece of AP list information by integrating the two pieces of list information and may determine at least one AP having the highest signal quality in the one piece of AP list information. For example, the electronic device 101 may add up values indicating a signal quality, based on the first AP list information and the second AP list information, and may select an AP having the highest signal quality. Referring to FIG. 7B, the electronic device 101 may determine one AP 3 706 having the highest signal quality, based on the one piece of AP list information, and may perform Wi-Fi communication using the one AP 3 706 (e.g., a signal quality number of 6). According to the example of FIG. 7B, the electronic device 101 may determine AP 3 706 as an AP for providing a continuity service, based on the first AP list information of the electronic device 101 and the second AP list information of the external electronic device 102. In this case, the electronic device 101 may change an AP to perform Wi-Fi communication through a Wi-Fi communication module (e.g., the Wi-Fi communication module 301 of FIG. 3) from AP 1 704 to AP 3 706, and may transmit information about the determined AP (e.g., AP 3 706) to the external electronic device 102 so that the external electronic device 102 changes an AP to perform Wi-Fi communication from AP 2 705 to AP 3 706.

Figure 7C:
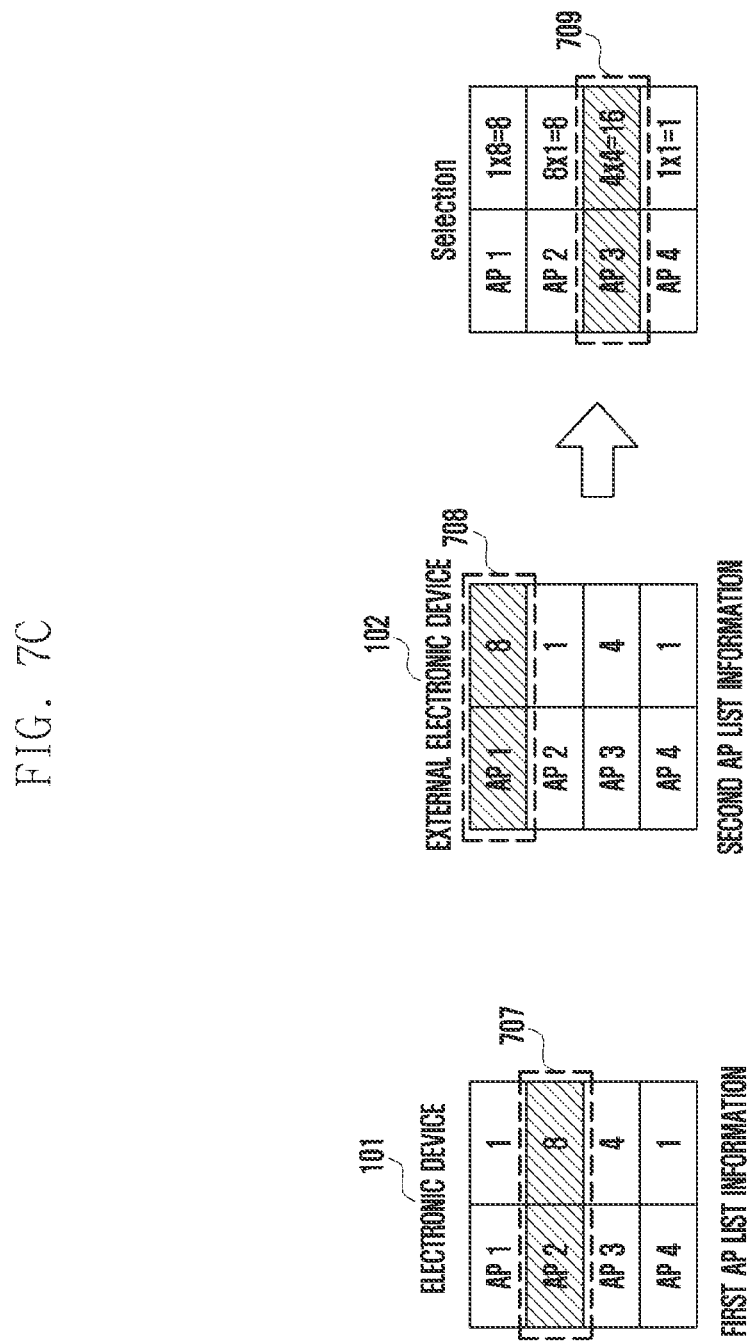
FIG. 7C is a diagram illustrating a third example in which an electronic device and an external electronic device select the same AP according to various embodiments.

FIG. 7C is a diagram illustrating a third example in which an electronic device and an external electronic device select one AP according to various embodiments.

Referring to FIG. 7C, the electronic device 101 may generate first AP list information related to at least one AP connectable based on the electronic device 101, and the external electronic device 102 may generate second AP list information related to at least one AP connectable based on the external electronic device 102.

Referring to FIG. 7C, the electronic device 101 may perform Wi-Fi communication through AP 2 707 having a signal quality value of 8, based on the first AP list information. The external electronic device 102 may perform Wi-Fi communication through AP 1 708 having a signal quality value of 8, based on the second AP list information.

Referring to FIG. 7C, the electronic device 101 may compare and/or analyze the first AP list information and the second AP list information. According to an embodiment, the electronic device 101 may generate one piece of AP list information by integrating the two pieces of list information and may determine at least one AP having the highest signal quality in the one piece of AP list information. For example, the electronic device 101 may multiply values indicating a signal quality, based on the first AP list information and the second AP list information, and may select an AP ensuring a high signal quality equally for the electronic device 101 and the external electronic device 102. Referring to FIG. 7C, the electronic device 101 may determine one AP 3 709 (e.g., a signal quality number of 16) ensuring a high signal quality equally for the electronic device 101 and the external electronic device 102, based on the one piece of AP list information. The electronic device 101 and the external electronic device 102 may access AP 3 709 substantially at the same time, and may perform Wi-Fi communication with a signal quality ensured equally for both devices.

According to an embodiment, the electronic device 101 and the external electronic device 102 may determine one AP, based on a preset priority. For example, a priority for an AP may be determined based on at least one of a user preference, an AP that also supports other communications (e.g., 5G communication or NR communication), an AP of a specific carrier, the communication record (e.g. history) of an AP previously used, and/or a charge for an AP. The priority for the AP may be set automatically or manually by the user. According to an embodiment, the electronic device 101 and the external electronic device 102 may determine at least one AP, based on the security level of an AP. For example, when an AP of which authentication has been previously completed through an authentication process is identified, the electronic device 101 and the external electronic device 102 may preferentially determine the AP of which the authentication has been completed.

According to an embodiment, one AP may be determined based on attribute information about the electronic device 101 and the external electronic device 102. For example, with a priority preset, an AP connected to a device of a high priority may be determined as the one AP, based on attribute information about the electronic device 101. For example, priorities may be set in an order of a portable electronic device, a tablet computer, a TV, and a refrigerator, the electronic device 101 may be a portable electronic device, and the external electronic device 102 may be a tablet computer. In this case, the external electronic device 102 may determine an AP connected to the electronic device 101 of a relatively high priority as the one AP, based on the preset priorities. The electronic device 101 and the external electronic device 102 may perform wireless communication according to the Wi-Fi communication method through the determined one AP.

According to an embodiment, one AP may be determined based on mobility of the electronic device 101 and the external electronic device 102. For example, based on detecting that the electronic device 101 moves in a direction to the external electronic device 102, a weight (or priority) may be given to an AP connected to the external electronic device 102, thereby determining one AP.

According to an embodiment, the electronic device 101 and the external electronic device 102 may randomly determine at least one AP. For example, the electronic device 101 may assign the same random probability to connectable APs and may randomly select one AP. In another example, the electronic device 101 may assign different random probabilities to connectable APs and may select one AP. The electronic device 101 may assign the different random probabilities, based on a signal quality for an AP and/or performance of an AP.

According to an embodiment, one AP may be selected based on information about a first AP being connected with the electronic device 101 and information about a second AP being connected with the external electronic device 102. For example, when either the electronic device 101 or the external electronic device 102 is weighted and an AP being connected with the weighted device is included in a first AP list and a second AP list, the AP being connected with the weighted device may be selected. According to an embodiment, the electronic device 101 and the external electronic device 102 may provide a continuity service to the user, based on the selected one AP.

According to an embodiment, one AP may be selected based on a device requesting an AP list among the electronic device 101 and the external electronic device 102. For example, when the electronic device 101 has a first AP list and requests a second AP list from the external electronic device 102, if an AP connected with the electronic device 101 is included in the second AP list, the AP connected with the electronic device 101 may be determined as the same one AP for a continuity service.

Figure 8:
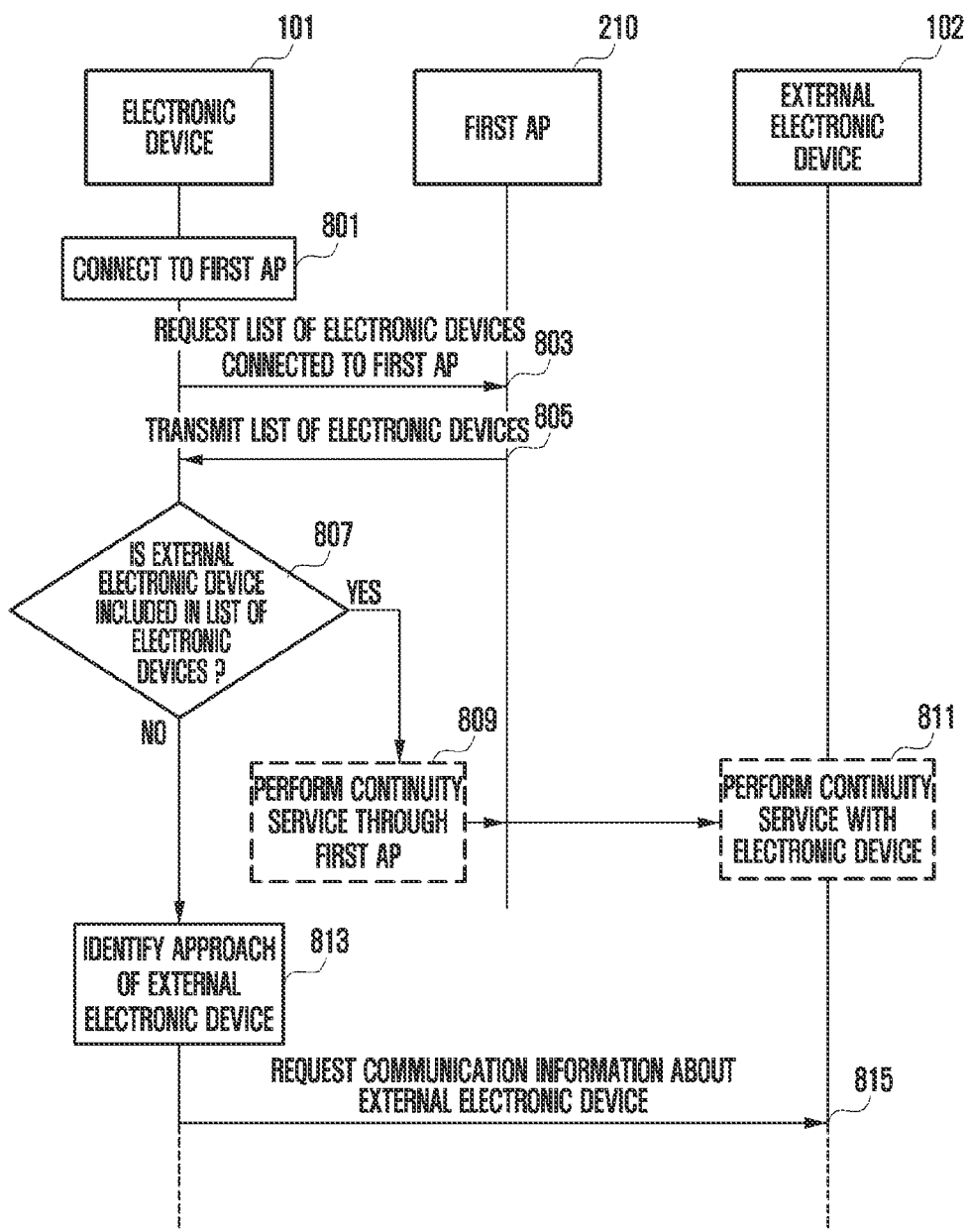
FIG. 8 is a signal flow diagram illustrating an example process performed by an electronic device when a continuity service is required according to various embodiments.

FIG. 8 is a signal flow diagram illustrating an example process performed by an electronic device when a continuity service is required according to various embodiments.

Referring to FIG. 8, the electronic device (e.g., the electronic device 101 of FIG. 1) and an external electronic device (e.g., the electronic device 102 of FIG. 1) may support a Wi-Fi communication method (e.g., a first communication method) and/or a BLE communication method (e.g., a second communication method).

According to an embodiment, the electronic device 101 may identify whether a continuity service is required for the external electronic device 102 while performing Wi-Fi communication through a first AP 210. According to an embodiment, when the continuity service for the external electronic device 102 is required, the electronic device 101 may identify at least one electronic device (e.g., the external electronic device 102) connected to the first AP 210 through a Wi-Fi communication network (e.g., a basic service set (BSS) network) including the first AP 210. For example, the electronic device 101 may transmit a query frame according to a multicast method, based on a universal plug and play (UPnP) protocol and/or a managed data network service (mDNS) protocol corresponding to the currently connected Wi-Fi communication network, and may receive a resource record frame from a different electronic device having received the query frame. The electronic device 101 may identify at least one electronic device connected to the first AP 210 upon receiving the resource record frame. When the external electronic device 102 is connected to the first AP 210, the electronic device 101 and the external electronic device 102 may immediately execute a continuity service, based on the first AP 210.

In operation 801, the electronic device 101 may be operatively connected to the first AP 210, based on the Wi-Fi communication method. For example, the electronic device 101 may select the first AP 210, based on a first AP list including at least one AP connectable to the electronic device 101, and may be operatively connected to the first AP 210.

In operation 803, the electronic device 101 may request a list of electronic devices connected to the first AP 210 from the first AP 210. For example, the first AP 210 may identify an electronic device being connected to the first AP 210 and may provide information about the identified electronic device in response to the request from the electronic device 101. In operation 805, the first AP 210 may transmit the list of electronic devices to the electronic device 101. According to an embodiment, the electronic device 101 may transmit a query frame, based on a Wi-Fi communication network and may receive a resource record frame from a different electronic device (e.g., the external electronic device 102) having received the query frame. The electronic device 101 may identify at least one electronic device connected to the first AP 210 upon receiving the resource record frame.

In operation 807, the electronic device 101 may identify whether the external electronic device 102 is included in the list of electronic devices being connected to the first AP 210. When the external electronic device 102 is included in the list of electronic devices (e.g., when the external electronic device 102 is performing Wi-Fi communication through the first AP 210) (Yes in operation 807), the electronic device 101 may execute a continuity service through the first AP 210 in operation 809. In operation 809, the electronic device 101 may transmit a signal for requesting the external electronic device 102 to also perform the continuity service to the external electronic device 102. In operation 811, the external electronic device 102 may execute the continuity service through the first AP 210. The electronic device 101 and the external electronic device 102 may perform the continuity service through the first AP 210. For example, the electronic device 101 and the external electronic device 102 may share continuity service-related information.

When the external electronic device 102 is not included in the list of electronic devices (e.g., when the external electronic device 102 is not connected to the first AP 210) in operation 807 (No in operation 807), the electronic device 101 may identify whether the external electronic device 102 approaches in operation 813. For example, the electronic device 101 may identify whether the external electronic device 102 to perform the continuity service is in a location close to the electronic device 101 (e.g., a location enabling BLE communication). Operation 813 may be the same as or similar to operation 505 of FIG. 5 described above. In operation 815, when identifying the approach of the external electronic device 102, the electronic device 101 may request communication information about the external electronic device 102. Operation 815 may be the same as or similar to operation 507 of FIG. 5 described above. Since a process after operation 815 is the same as the operations after operation 507 of FIG. 5, a description of the process after operation 815 is replaced with the description of FIG. 5.

According to an embodiment, the electronic device 101 may preferentially identify whether the external electronic device 102 is being connected to the first AP 210, and may immediately perform the continuity service when the external electronic device 102 is connecting to the first AP 210. According to an embodiment, when identifying that the external electronic device 102 is being connected to the first AP 210, the electronic device 101 may omit a process of obtaining communication-related information about the external electronic device 102 through the BLE communication 530 illustrated in FIG. 5. The electronic device 101 may perform the continuity service together with the external electronic device 102 through the first AP 210.

Figure 9:
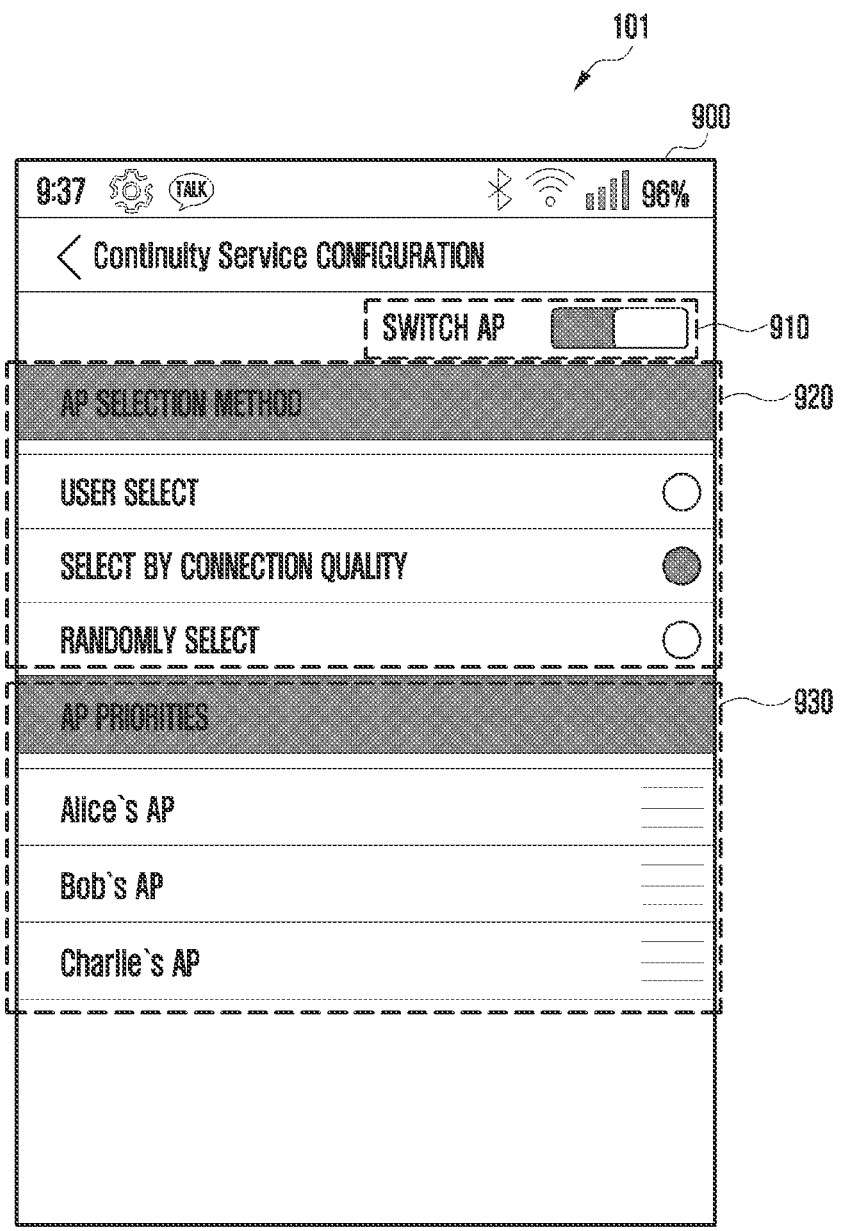
FIG. 9 is a diagram illustrating an example user interface for configuring an AP determination method according to various embodiments.

FIG. 9 is a diagram illustrating an example user interface for configuring an AP determination method according to various embodiments.

Referring to FIG. 9, an electronic device (e.g., the electronic device 101 of FIG. 1) may configure a method for selecting one AP with which Wi-Fi communication is established through a display module (e.g., the display module 160 of FIG. 1). For example, the electronic device 101 may configure whether to allow a switch of an AP under control of an external electronic device 102. The electronic device 101 may prioritize APs to preferentially select a specific AP or may configure a different criterion for selecting an AP.

Referring to FIG. 9, the electronic device 101 may display a configuration interface 900 for determining one AP with which Wi-Fi communication is established on the display module 160. The configuration interface 900 may include an object 910 to allow a switch of an AP under the control of the external electronic device 102. The configuration interface 900 may include a first option 920 to select one AP with which Wi-Fi communication is established and a second option 930 to determine a priority for an AP. For example, the first option 920 may include an option to select at least one AP by a user's selection, an option to select at least one AP based on a connection quality (e.g., a signal quality or signal strength), and/or an option to randomly select at least one AP. According to an embodiment, the first option 920 is not limited to the option illustrated in FIG. 9. For example, the second option 930 may include a user option to preferentially select a specific AP.

FIGS. 10A, 10B, 10C, and 10D are diagrams illustrating example processes in which an electronic device connects to an external electronic device according to various embodiments.

FIGS. 10A, 10B, 10C, and 10D illustrate a process in which the electronic device (e.g., the electronic device 101 of FIG. 1) selects the same one AP (e.g., the AP 210 of FIG. 3) and performs Wi-Fi communication with the external electronic device (e.g., the external electronic device 102 of FIG. 1) to provide a continuity service to a user.

According to an embodiment, the electronic device 101 may execute a continuity service and may retrieve at least one external electronic device (e.g., the external electronic device 102) located nearby, based on execution of the continuity service. The electronic device 101 may display a list 1010 including at least one connectable external electronic device, based on a retrieval result.

Figure 10A:
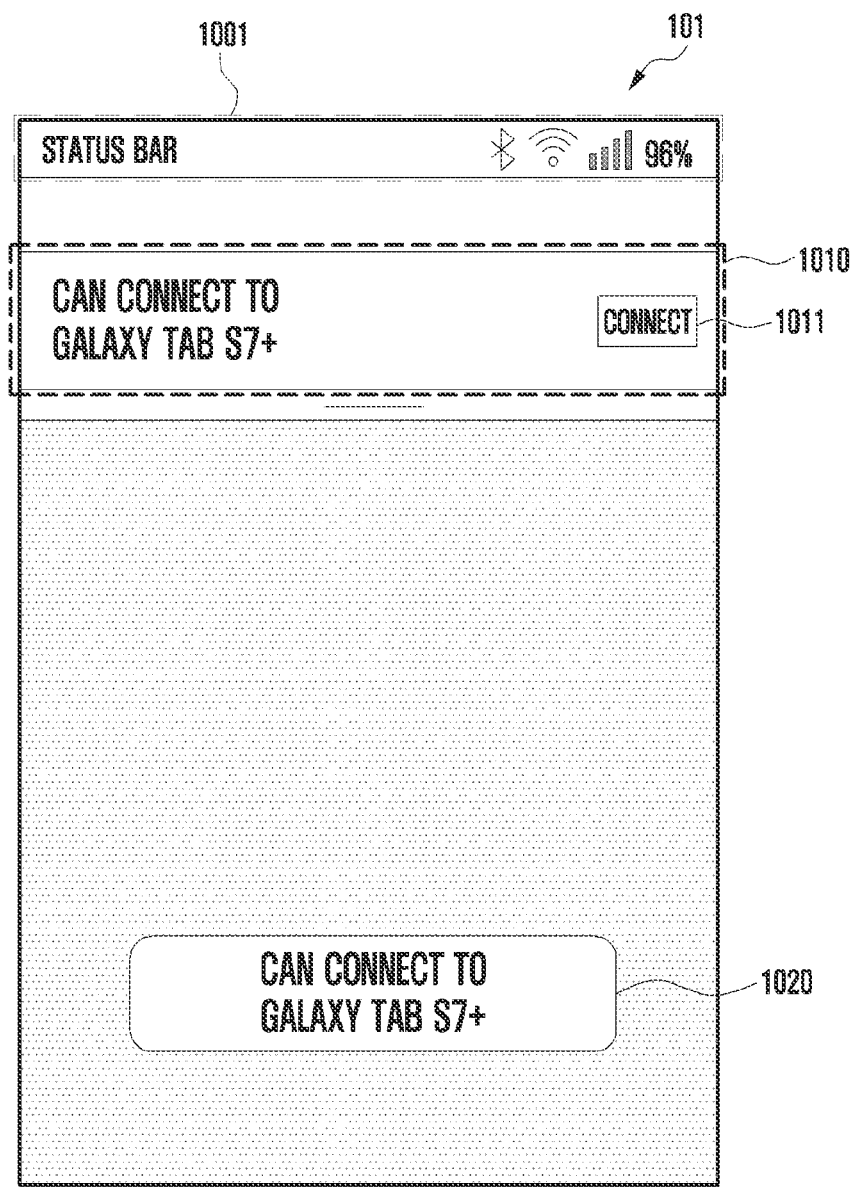
FIGS. 10A, 10B, 10C, and 10D are diagrams illustrating an example process in which an electronic device connects to an external electronic device according to various embodiments.

Referring to FIG. 10A, the electronic device 101 may display a user interface (UI) for selecting the external electronic device 102 including a status bar 1001. For example, the electronic device 101 may display a list 1010 of at least one connectable external electronic device 102 and may display an object 1011 for connecting to the external electronic device 102. The user interface may include a guide message 1020 indicating that connection to the external electronic device 102 is possible. According to an embodiment, the electronic device 101 may output an audio signal (e.g., a notification signal) indicating at least one connectable external electronic device 102 through an audio module (e.g., the audio module 170 of FIG. 1). Referring to FIG. 10A, the electronic device 101 may select at least one external electronic device 102 (e.g., Galaxy Tab S7+) in response to a user input to the object 1011.

According to an embodiment, the electronic device 101 may display a status bar 1001 (e.g., a notification window) that displays the number of at least one connectable external electronic device and/or the number of connected external electronic devices, based on the continuity service. For example, as illustrated in FIG. 10D, the status bar 1001 may display the number of electronic devices connectable based on the current communication state of the electronic device 101 and/or the number of electronic devices being connected based on the continuity service. For example, the electronic device 101 may periodically update information displayed on the status bar 1001.

Figure 10B:
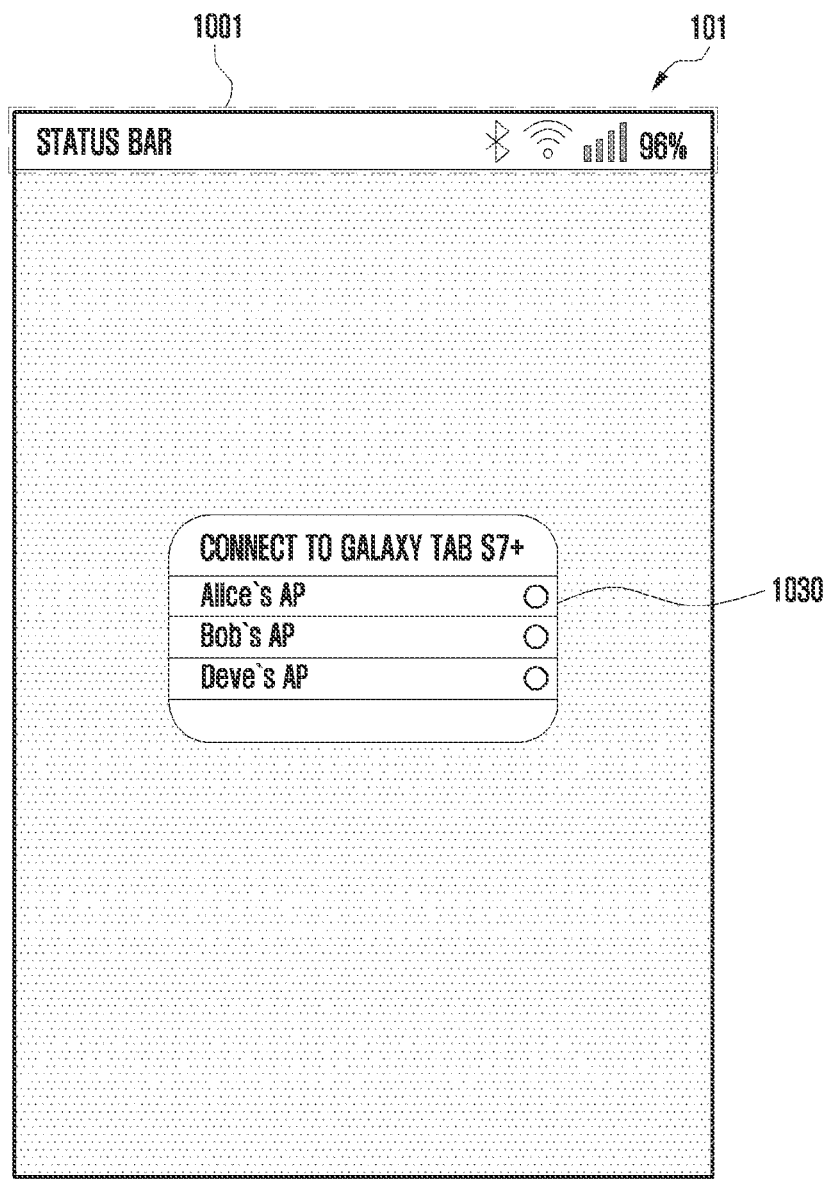

Referring to FIG. 10B, the electronic device 101 may display an option 1030 to select at least one AP (e.g., the AP 210 of FIG. 3) to which the electronic device 101 is connected simultaneously with the at least one external electronic device 102. According to an embodiment, the electronic device 101 may automatically select at least one AP, based on preset configuration information or may manually select at least one AP in response to a user input. Referring to FIG. 10B, the option 1030 may display a list of connectable APs (e.g., Alice's AP, Bob's AP, and Deve's AP) and may select one AP in response to the user input.

Figure 10C:
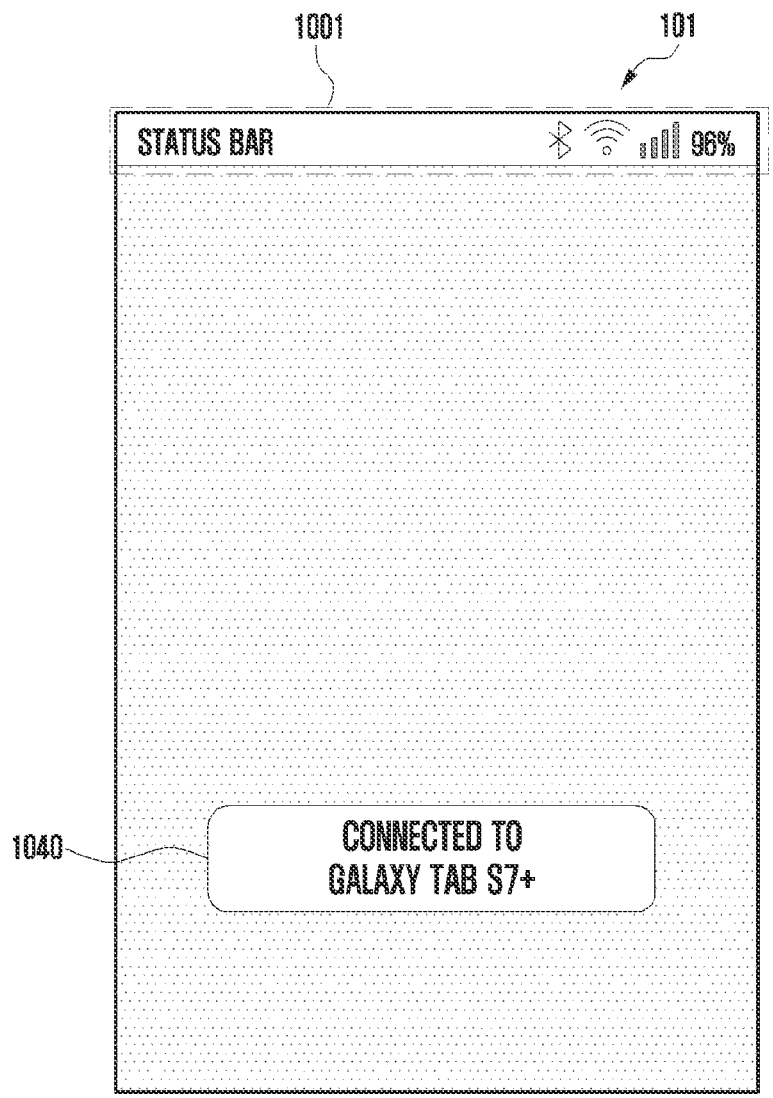
Figure 10D:
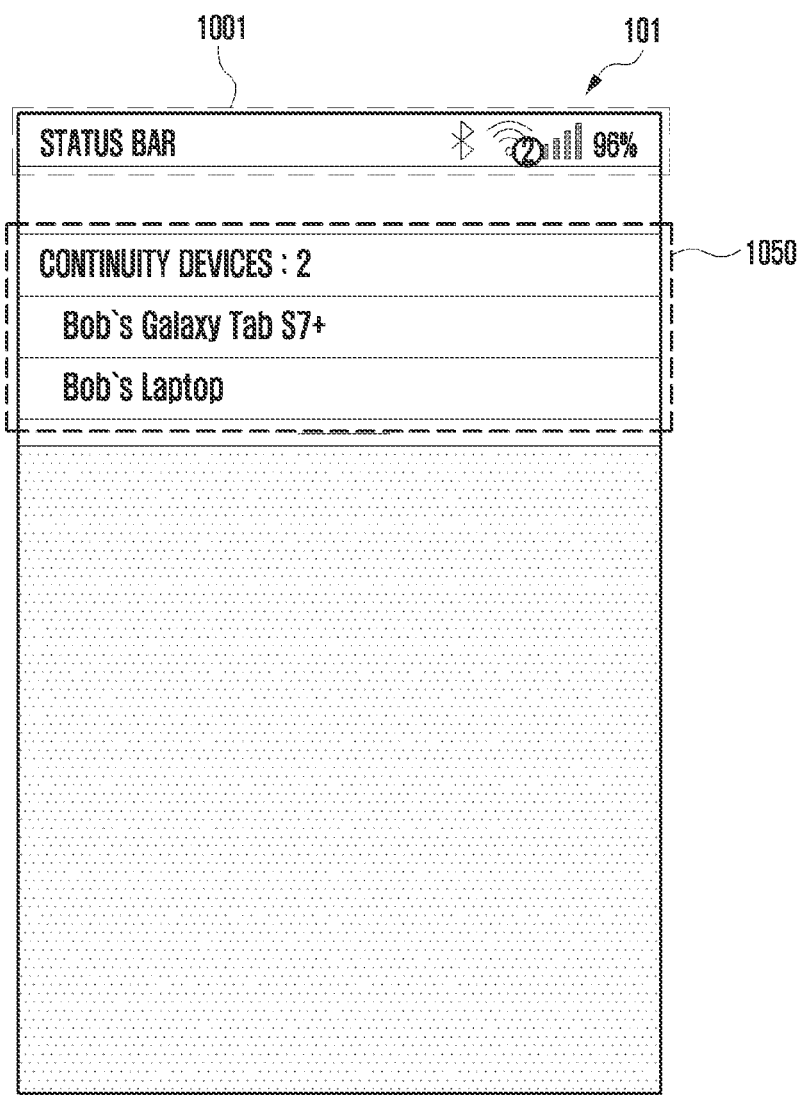

Referring to FIG. 10C, when the electronic device 101 is connected to the external electronic device 102, based on the selected one AP, the electronic device 101 may display a notification message 1040 indicating the connection. The electronic device 101 and the external electronic device 102 may provide the continuity service to the user through the one AP 210 to which the electronic device 101 and the external electronic device 102 are simultaneously connected. For example, the electronic device 101 may share context information (e.g., configuration information or clipboard information) related to a specific program with the external electronic device 102, and when the external electronic device 102 executes the specific program, the specific program may be executed based on the shared context information. The electronic device 101 and the external electronic device 102 may share context information periodically or when a sharing event occurs, and each electronic device may utilize the shared context information.

Referring to FIG. 10D, the electronic device 101 may display additional external electronic devices capable of providing the continuity service in a list 1050 while executing the continuity service. For example, the electronic device 101 may display at least one external electronic device capable of connecting to the currently connected AP 210. In another example, the electronic device 101 may display at least one external electronic device having responded to a BLE advertisement signal transmitted through a BLE communication module 303.

Figure 11:
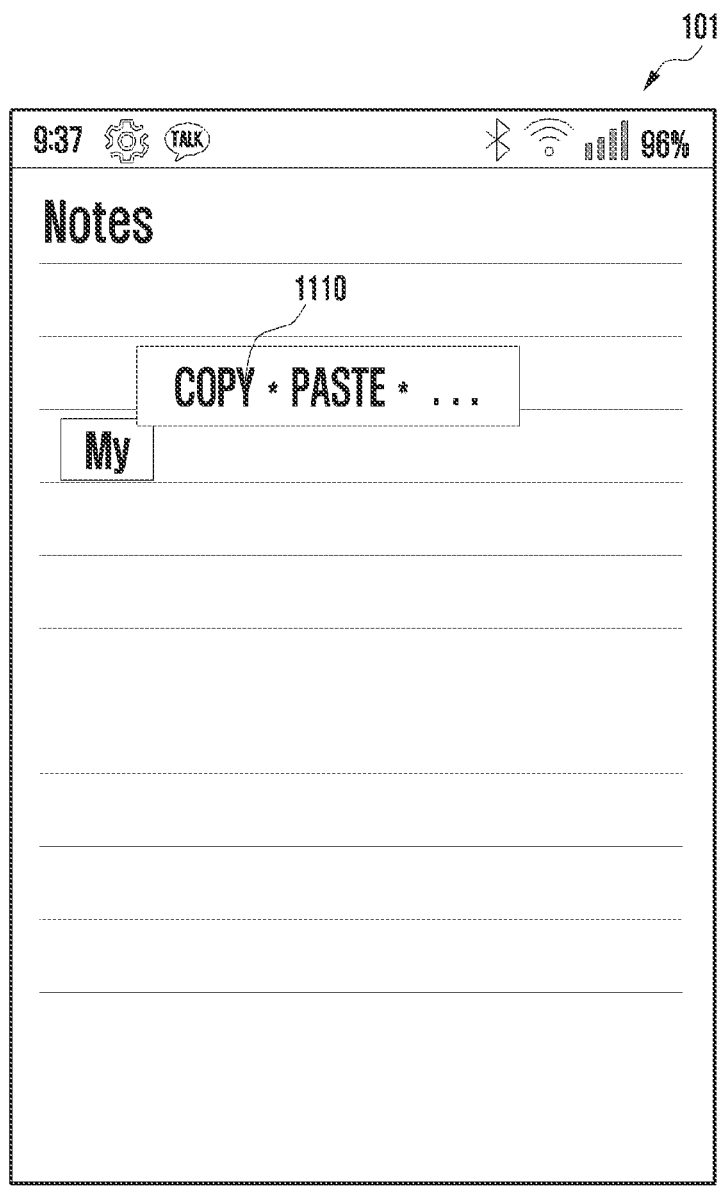
FIG. 11 is a diagram illustrating an example user interface when a continuity service is provided according to various embodiments.

FIG. 11 is a diagram illustrating an example user interface when a continuity service is provided according to various embodiments.

Referring to FIG. 11, with a continuity service executed, when performing a function based on the continuity service, an electronic device (e.g., the electronic device 101 of FIG. 1) and an external electronic device (e.g., the electronic device 102 of FIG. 1) may display a specific icon 1110 corresponding to the function. For example, the specific icon 1110 may indicate to a user that the function is a function related to the continuity service. For example, when the electronic device 101 performs a "copy" function with respect to at least one content, the at least one content may be stored in a clipboard, and the clipboard may be shared with the external electronic device 102. When the external electronic device 102 performs a function (e.g., copy, paste, or cut) related to the clipboard, the external electronic device 102 may display an additional icon 1110 corresponding to the function. According to an embodiment, the user may identify the additional icon 1110, may identify that the electronic device 101 and the external electronic device 102 are performing the continuity service, and may determine whether to utilize data stored in the clipboard. According to an embodiment, in providing the continuity service to the user, the electronic device 101 may display the specific icon 1110 corresponding to a specific function so that the specific function can be performed as intended by the user.

According to an embodiment, when a function related to a continuity service is performed while the continuity service is being performed in the electronic device 101 and the external electronic device 102, a notification message (e.g., a pop-up message or a notification signal) indicating that the continuity service is being performed may be provided to the user. According to an embodiment, the electronic device 101 may display a configuration interface for determining whether to perform a continuity service. When the user does not want to perform a continuity service, the user may terminate the continuity service.

According to various embodiments of the disclosure, the number of external electronic devices capable of providing a continuity service with the electronic device 101 may not be limited to one. For example, the electronic device 101 may provide a continuity service with two or more external electronic devices (e.g., a first external electronic device and a second external electronic device) connected to the same one AP. According to an embodiment, for the electronic device 101 to provide the continuity service with two or more external electronic devices, the electronic device 101 may receive an AP list from each of a plurality of external electronic devices and may select the same one AP as an AP to which the electronic device 101 and the plurality of external electronic devices are connectable AP. For example, based on a first AP list including an AP connectable with the electronic device 101, a second AP list including an AP connectable with the first external electronic device, and a third AP list including an AP connectable with the second external electronic device, the electronic device 101 may select the same one AP to which the individual devices are connectable. The electronic device 101, the first external electronic device, and/or the second external electronic device may provide the continuity service to the user, based on the selected same one AP.

A method for an electronic device (e.g., the electronic device 101 of FIG. 1) according to various example embodiments may include: connecting to a first AP included in a first AP list based on a first communication method (e.g., a Wi-Fi communication method), receiving a signal based on a second communication method (e.g., a BLE communication method) transmitted from an external electronic device (e.g., the electronic device 102 of FIG. 1) connected to a second AP included in a second AP list, obtaining account information about the external electronic device and the second AP list including information about the second AP connected with the external electronic device from the external electronic device, based on the second communication method upon receiving the signal, determining one AP, based on the first AP list and the second AP list based on account information about the electronic device and the account information about the external electronic device at least partly matching, and performing wireless communication with the external electronic device, based on the first communication method through the determined one AP.

The method according to an example embodiment may further include: transmitting the signal based on the second communication method to an outside based on a configured period, and identifying approach of the external electronic device based on receiving a response signal corresponding to the signal from the external electronic device.

According to an example embodiment, the obtaining from the external electronic device may include: requesting communication information related to the external electronic device from the external electronic device based on the signal, and obtaining the account information about the external electronic device and the second AP list including the information about the second AP from the external electronic device in response to a request.

The method according to an example embodiment may further include: establishing a connection for communication based on the second communication method with the external electronic device based on the signal, and obtaining a packet including communication information related to the external electronic device from the external electronic device with which the connection for communication is established.

According to an example embodiment, the determining of the one AP may include: determining the one AP based on a signal quality of at least one AP included in the first AP list, a signal quality of at least one AP included in the second AP list, a preset priority corresponding to the at least one AP, a user preference, a communication record of the at least one AP, and/or a charge for the at least one AP.

The method according to an example embodiment may further include: determining whether to execute a continuity service with the external electronic device upon receiving the signal based on the second communication method, obtaining list information of at least one electronic device being connected to the first AP from the first AP when executing the continuity service, and performing wireless communication with the external electronic device based on the first communication method through the first AP based on the list information of the at least one electronic device including the external electronic device.

The method according to an example embodiment may further include: transmitting a request signal for requesting a switch to the determined one AP to the external electronic device, performing the wireless communication with the external electronic device based on the first communication method through the determined one AP based on the external electronic device succeeding in switching to the one AP, determining a different AP based on the first AP list and the second AP list based on the external electronic device failing to switch to the one AP, and retransmitting a request signal for requesting a switch to the determined different AP to the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The embodiments of the present disclosure and the accompanying drawings are only examples in order to easily describe the present disclosure and facilitate understanding of the present disclosure, but are not intended to limit the scope of the present disclosure. Therefore, in addition to the embodiments disclosed herein, the scope of the present disclosure should be construed to include all modifications or modified forms drawn based on the present disclosure and is included the appended claims and their equivalents. It will also be understood that any of the embodiment(s) described herein may be used in conjunction with any other embodiment(s) described herein.

What is claimed is:

1. An electronic device comprising:
   a communication module, comprising communication circuitry, configured to support a first communication technique comprising Wi-Fi and a second communication technique comprising Bluetooth;
   memory storing instructions; and
   a processor, comprising processing circuitry, operatively connected to the communication module and the memory,
   wherein the instruction, when executed by the processor, cause the electronic device to:
   connect to a first access point (AP) included in a first AP list stored in the memory based on the first communication technique,
   receive a signal transmitted from an external electronic device based on the second communication technique,
   obtain, in response to receiving the signal, second account information of the external electronic device and a second AP list comprising information of a second AP connected with the external electronic device from the external electronic device based on the second communication technique,
   determine one AP, based on the first AP list and the second AP list when first account information stored in the memory at least partly match the second account information of the external electronic device, and
   perform, via the determined one AP, wireless communication with the external electronic device based on the first communication technique.

2. The electronic device of claim 1, wherein the instruction, when executed by the processor, cause the electronic device to:
   transmit the signal to an outside using the second communication technique based on a configured period, and
   receive a response signal corresponding to the signal from the external electronic device.

3. The electronic device of claim 2, wherein the instruction, when executed by the processor, cause the electronic device to:
   request communication information related to the external electronic device from the external electronic device, and
   obtain, in response to a requesting the communication information, the second account information of the external electronic device and the second AP list comprising the information of the second AP from the external electronic device.

4. The electronic device of claim 2, wherein the instruction, when executed by the processor, cause the electronic device to:
   establish a connection for communication based on the second communication technique with the external electronic device based on the signal, and
   obtain a packet comprising communication information related to the external electronic device from the external electronic device with which the connection for communication is established.

5. The electronic device of claim 1, wherein the first AP list and the second AP list comprise at least one of a service set identifier (SSID) for identifying at least one AP, a basic service set identifier (BSSID), a Wi-Fi channel number through which the at least one AP communicates, a Wi-Fi standard technology supportable by the one AP, physical location information about the one AP, information about at least one electronic device connected to the one AP, information indicating whether the one AP is connectable, or information indicating whether the one AP is connected to an Internet.

6. The electronic device of claim 1, wherein the instruction, when executed by the processor, cause the electronic device to:
   determine the one AP based on a signal quality of one AP included in the first AP list, a signal quality of one AP included in the second AP list, a preset priority corresponding to the one AP, a user preference, a communication record of the one AP, or a charge for the one AP.

7. The electronic device of claim 6, wherein the signal quality of the one AP is identified based on at least one piece of information among a received signal strength indicator (RSSI), channel utilization (CU), a modulation coding scheme (MCS), a signal-to-noise ratio (SNR), a channel busy ratio (CBR), or a packet error rate (PER) related to the one AP.

8. The electronic device of claim 1, wherein the instruction, when executed by the processor, cause the electronic device to:
   determine, in response to receiving the signal using the second communication technique, whether to execute a continuity service with the external electronic device,
   obtain list information of at least one electronic device being connected to the first AP from the first AP when the continuity service execute, and
   perform, via the first AP, wireless communication with the external electronic device based on the first communication technique when the external electronic device is included in the list information of the at least one electronic device.

9. The electronic device of claim 1, wherein the instruction, when executed by the processor, cause the electronic device to:
transmit a request signal for requesting a switch to the determined AP to the external electronic device, and
performs, via the determined AP, the wireless communication with the external electronic device based on the first communication technique, when the external electronic device switches to the determined AP.

10. The electronic device of claim 9, wherein the instruction, when executed by the processor, cause the electronic device to:
determine a different AP, based on the first AP list and the second AP list based on the external electronic device failing to switch to the one AP, and
transmit a request signal for requesting a switch to the determined different AP to the external electronic device.

11. A method for operating an electronic device, comprising:
connecting to a first AP included in a first AP list based on a first communication technique comprising Wi-Fi;
receiving a signal transmitted from an external electronic device connected to a second AP included in a second AP list based on a second communication technique, comprising Bluetooth;
obtaining, in response to receiving the signal, second account information of the external electronic device and the second AP list comprising information of the second AP connected with the external electronic device from the external electronic device based on the second communication technique;
determining one AP, based on the first AP list and the second AP list when first account information stored in the memory at least partly match the second account information of the external electronic device; and
performing, via the determined AP, wireless communication with the external electronic device based on the first communication technique.

12. The method of claim 11, further comprising:
transmitting the signal to an outside using the second communication technique based on a configured period; and
identifying an approach of the external electronic device when a response signal corresponding to the signal is received from the external electronic device.

13. The method of claim 12, wherein the obtaining from the external electronic device comprises:
requesting communication information related to the external electronic device from the external electronic device; and
obtaining, in response to requesting the communication information, the second account information of the external electronic device and the second AP list comprising the information of the second AP from the external electronic device.

14. The method of claim 12, further comprising:
establishing a connection for communication based on the second communication technique with the external electronic device based on the signal; and
obtaining a packet comprising communication information related to the external electronic device from the external electronic device with which the connection for communication is established.

15. The method of claim 11, wherein the determining of the one AP comprises determining the one AP based on a signal quality of one AP included in the first AP list, a signal quality of one AP included in the second AP list, a preset priority corresponding to the one AP, a user preference, a communication record of the one AP, or a charge for the one AP.

16. The method of claim 11, further comprising:
determining whether to execute a continuity service with the external electronic device in response to an approach of the external electronic device;
obtaining list information of at least one electronic device being connected to the first AP from the first AP list when the continuity service executes; and
performing, via the first AP, wireless communication with the external electronic device based on the first communication technique when the external electronic device is included in the list information of the at least one electronic device.

17. The method of claim 11, further comprising:
transmitting a request signal for requesting a switch to the determined AP to the external electronic device;
performing, via the determined AP, the wireless communication with the external electronic device based on the first communication technique when the external electronic device succeeds in switching to the determined AP;
determining a different AP based on the first AP list and the second AP list, when the external electronic device fails to switch to the determined AP; and
transmitting a request signal for requesting a switch to the determined different AP to the external electronic device.

* * * * *